United States Patent
Li et al.

(10) Patent No.: US 11,974,895 B2
(45) Date of Patent: May 7, 2024

(54) DENTAL APPLIANCE HAVING PARTICULATE LASER MARKING

(71) Applicant: Align Technology, Inc., San Jose, CA (US)

(72) Inventors: Chunhua Li, Cupertino, CA (US); Yan Chen, Cupertino, CA (US); Fangxiao Guan, Cupertino, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 16/677,546

(22) Filed: Nov. 7, 2019

(65) Prior Publication Data

US 2020/0085537 A1    Mar. 19, 2020

Related U.S. Application Data

(63) Continuation of application No. 16/562,639, filed on Sep. 6, 2019, now Pat. No. 11,602,413.

(60) Provisional application No. 62/728,598, filed on Sep. 7, 2018.

(51) Int. Cl.
*A61C 7/08* (2006.01)
*B23K 26/352* (2014.01)

(52) U.S. Cl.
CPC ........... *A61C 7/08* (2013.01); *B23K 26/3584* (2018.08); *A61C 2201/002* (2013.01)

(58) Field of Classification Search
CPC ......... A61C 7/00; A61C 7/08; A61C 2201/00; A61C 2201/02; A61C 19/06; A61C 19/063; A61C 19/066; A61C 2204/007; A63B 71/085; B41M 5/267

USPC ........................................... 433/6, 68
See application file for complete search history.

(56) References Cited

U.S. PATENT DOCUMENTS

| | | | |
|---|---|---|---|
| 3,089,487 A * | 5/1963 | Enicks | A63B 71/085 128/861 |
| 6,276,930 B1 * | 8/2001 | Pozzi | A61C 7/14 433/9 |
| 7,840,373 B2 | 11/2010 | Culp et al. | |
| 2003/0224314 A1 | 12/2003 | Bergersen | |
| 2007/0037116 A1 * | 2/2007 | Knutson | A61C 9/0006 433/68 |
| 2007/0164113 A1 | 7/2007 | Culp et al. | |
| 2008/0141534 A1 * | 6/2008 | Hilliard | A61C 13/0027 29/896.11 |
| 2009/0280450 A1 * | 11/2009 | Kuo | A61C 7/08 433/9 |
| 2013/0020297 A1 * | 1/2013 | Gupta | B23K 26/1224 219/121.72 |
| 2013/0103120 A1 * | 4/2013 | Salteri | A61K 33/08 607/88 |
| 2014/0110288 A1 * | 4/2014 | Nadeau | A61B 50/33 206/363 |
| 2017/0007368 A1 | 1/2017 | Boronkay | |
| 2017/0007386 A1 * | 1/2017 | Mason | A61C 19/063 |
| 2017/0065372 A1 * | 3/2017 | Mah | A61N 5/0601 |

(Continued)

FOREIGN PATENT DOCUMENTS

| CN | 101188981 A | 5/2008 |
|---|---|---|
| CN | 104093375 A | 10/2014 |

*Primary Examiner* — Yogesh P Patel
(74) *Attorney, Agent, or Firm* — Shay Glenn LLP

(57) ABSTRACT

Dental appliances, materials, and methods of forming such appliances and materials for improved laser marking are provided herein including the use of a particulate material for enhancing laser marking.

16 Claims, 17 Drawing Sheets

(56) References Cited

U.S. PATENT DOCUMENTS

| | | | |
|---|---|---|---|
| 2017/0100214 A1 | 4/2017 | Wen | |
| 2018/0153648 A1 | 6/2018 | Shanjani et al. | |
| 2018/0303583 A1* | 10/2018 | Tong | A61C 7/28 |
| 2018/0304497 A1 | 10/2018 | Kitching et al. | |
| 2019/0009576 A1* | 1/2019 | Cole | B41M 5/0047 |
| 2019/0029522 A1 | 1/2019 | Sato et al. | |
| 2019/0159871 A1 | 5/2019 | Chan et al. | |
| 2019/0231480 A1 | 8/2019 | Moore, III | |
| 2020/0078137 A1 | 3/2020 | Chen et al. | |
| 2020/0121420 A1 | 4/2020 | Scurtescu et al. | |
| 2020/0121423 A1* | 4/2020 | Feng | A61C 7/002 |
| 2020/0179268 A1* | 6/2020 | Ehrenpreis | A61K 47/44 |
| 2021/0038357 A1* | 2/2021 | Wang | A61C 19/066 |
| 2022/0151736 A1 | 5/2022 | Webber | |

\* cited by examiner

200B

```
┌─────────────────────────────────────────────────────────┐
│  IDENTIFY A TARGET MARKING AREA ON A DENTAL APPLIANCE FOR│
│      MARKING THE DENTAL APPLIANCE WITH A LASER MARK     │
│                          221                             │
└─────────────────────────────────────────────────────────┘
                            ↓
┌─────────────────────────────────────────────────────────┐
│     IDENTIFY A LASER ACCESS AREA ON THE DENTAL APPLIANCE │
│   CORRESPONDING TO A REGION OF THE DENTAL APPLIANCE THAT │
│  PROVIDES LASER ENERGY WITH ACCESS TO THE TARGET MARKING AREA│
│                          223                             │
└─────────────────────────────────────────────────────────┘
                            ↓
┌─────────────────────────────────────────────────────────┐
│  FORM A SURFACE TEXTURE OF THE LASER ACCESS AREA TO DISPERSE│
│      THE LASER ENERGY PROVIDED TO THE LASER ACCESS AREA │
│                          225                             │
└─────────────────────────────────────────────────────────┘
```

```
┌─────────────────────────────────────────────────────────┐
│  IDENTIFY A TARGET MARKING AREA ON A DENTAL APPLIANCE FOR│
│      MARKING THE DENTAL APPLIANCE WITH A LASER MARK     │
│                          227                             │
└─────────────────────────────────────────────────────────┘
                            ↓
┌─────────────────────────────────────────────────────────┐
│  OPT. IDENTIFY A LASER ACCESS AREA ON THE DENTAL APPLIANCE│
│   CORRESPONDING TO A REGION OF THE DENTAL APPLIANCE THAT │
│  PROVIDES LASER ENERGY WITH ACCESS TO THE TARGET MARKING AREA│
│                          229                             │
└─────────────────────────────────────────────────────────┘
                            ↓
┌─────────────────────────────────────────────────────────┐
│  FORM TARGET MARKING AREA WITH INTERSPERSED PARTICULATE │
│   MATTER HAVING PARTICULATE PROPERTIES DIFFERENT THAN   │
│ PARTICULATE PROPERTIES OF OTHER PORTION OF DENTAL APPLIANCE│
│                          231                             │
└─────────────────────────────────────────────────────────┘
```

NON-TRANSITORY COMPUTER READABLE MEDIUM
9102

FORMING A VIRTUAL DENTAL APPLIANCE BODY INDICATED AS BEING FORMED FROM AT LEAST ONE MATERIAL, AT LEAST A PORTION OF THE BODY INDICATED AS BEING TRANSPARENT TO LASER ENERGY, AND DEFINING IN THE VIRTUAL BODY, A VIRTUAL TARGET AREA FOR LASER MARKING BETWEEN AN INTERIOR SURFACE AND AN EXTERIOR SURFACE OF THE APPLIANCE BODY AND INCLUDING INTERSPERSING A VIRTUAL FIRST PARTICULATE MATERIAL WITHIN THE TARGET AREA, WHEREIN THE FIRST PARTICULATE MATERIAL INDICATED AS HAVING A HEIGHTENED REACTIVITY TO A FIRST RANGE OF WAVELENGTHS OF LASER ENERGY AS COMPARED TO A SECOND RANGE OF WAVELENGTHS
9104

FIG. 9

DENTAL APPLIANCE HAVING PARTICULATE LASER MARKING

CROSS REFERENCE TO RELATED APPLICATIONS

This application is a continuation of U.S. patent application Ser. No. 16/562,639, filed Sep. 6, 2019, titled "IMPROVED LASER MARKING OF DENTAL APPLIANCES," which claims priority to U.S. Provisional Patent Application No. 62/728,598, filed on Sep. 7, 2018 and entitled "DENTAL APPLIANCES, MATERIALS, AND METHODS OF FORMING SUCH APPLIANCES AND MATERIALS FOR IMPROVED LASER MARKING," which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

TECHNICAL FIELD

The present disclosure is related generally to the field of dental appliance formation. More particularly, the present disclosure is related to dental appliances, materials, and methods of forming such appliances and materials for improved laser marking.

BACKGROUND

In the dental industry, dental treatments may involve, for instance, restorative and/or orthodontic procedures. Restorative procedures may be designed to implant a dental prosthesis (e.g., a crown, bridge inlay, onlay, veneer, etc.) intraorally in a patient. Orthodontic procedures may include repositioning misaligned teeth and changing bite configurations for improved cosmetic appearance and/or dental function. Orthodontic repositioning can be accomplished, for example, by applying controlled forces to one or more teeth over a period of time.

As an example, orthodontic repositioning may be provided through a dental process that uses positioning appliances for realigning teeth. Such appliances may utilize a thin shell of material having resilient properties, referred to as an "aligner," that generally conforms to a user's teeth but is slightly out of alignment with a current tooth configuration. Placement of such an appliance over the teeth may provide controlled forces in specific locations to gradually move the teeth into a new configuration. Repetition of this process with successive appliances in progressive configurations can move the teeth through one or more intermediate arrangements to a final and/or desired arrangement.

Such systems may utilize materials that are lightweight and/or transparent to provide as a set of appliances that can be used serially such that, as the teeth move, a new appliance can be implemented to further move the teeth.

Specific orthodontic appliances may have to be used in an appropriate sequence and/or be specific to a user. It may be desirable to mark aligners with information, patterns, advertising, and/or other items. Existing techniques make it difficult to mark aligners with, e.g., information, advertising, patterns, etc., particularly in light of the material limitations of aligner materials and/or the demands of an intraoral environment.

SUMMARY

Described herein are dental appliances that are configured to allow laser marking on or within the body of the dental appliance in a highly energy-efficient manner, and methods of forming or manufacturing them, including methods of marking them. Any of these variations may include a surface texture that may assist in effectively laser marking the dental appliance. Alternatively or additionally, any of the dental appliances may include an additive material within the aligner body, which may be otherwise transparent and/or translucent, that may react with the laser to enhance marking; for example, the additive may be a particulate material having a laser energy absorption characteristic that is greater than that of the material used to form the body without the at least one particulate material. In some variations the dental appliances include dental aligners or palatal expanders.

Laser marking and mark reading may be part of a dental appliance manufacturing process. The methods and apparatuses (e.g., systems and devices, including gin particular dental appliances such as dental aligners) may save energy and time in the laser marking process by reducing the required laser energy needed to effectively and efficiently mark the material of the dental appliance (e.g., the plastic materials forming the dental appliance). These methods and apparatuses may also allow a high resolution for laser marks and enhance subsequent laser mark reading efficiency.

In some of the variations described herein, one or more additives (e.g., particulate materials) may be added to the dental appliance throughout the entire appliance or restricted to a particular region (or sub-region) to be marked. Such additives may, e.g., utilize nanosecond fiber lasers. Thus, in some variations, an additive material (e.g., a particulate material) may be included in a center region and/or layer of the dental appliance (e.g., a wall of a dental aligner), so that laser marking may be performed in this region with significantly less laser energy consumption and faster marking speed than conventional techniques. In some variations, the laser marking may be well-defined in the center of the aligner. Thus, in some variations the surface may be unaffected after laser marking. Laser mark reading efficiency can be significantly improved because of the resulting high resolution laser marks with good contrast, sharp edge details.

Any appropriate particulate material that enhances laser marking may be used. For example, the particulate material may be a dye or pigment that has a laser energy absorption characteristic that enhances marking when laser energy is applied. Examples of such particulate materials may include pigments (which may be, for example, suspended within and/or layered into the material forming a portion of the dental appliance), coatings (e.g., on an inner layer), inks (which may be coated or suspended within the material forming all or a portion of the dental appliance) and/or dyes. The particulate material may be a chemical indicator that irreversibly changes phase based on temperature; heat from the applied laser energy may result in a permanent color change. For example, the particulate material may be a heat responsive irreversible color changing material. In some variations the particulate material is a photochromic material that changes color when exposed to certain wavelengths of light (such as UV light). Examples of particulate materials may include mica coated with metal oxides (such as selenium and ferric), pearl pigment, Aluminum silicate, metallic aluminum flakes, iron oxide, etc. For example, a commercially available examples of particulate materials that may be used, may include: IRIOTEC 8826 (Merck).

In some variations, the dental appliance may include a region having a surface texture that is configured to enhance laser marking. The surface texture may be used with or without an additive.

For example, a dental appliance may include a surface of the dental appliance configured to interface with buccal and lingual regions of a patient, the dental appliance including a plurality of tooth-receiving cavities to receive a corresponding plurality of teeth and to exert one or more orthodontic repositioning forces on the plurality of teeth, and a first portion of the surface having a first surface texture; a target marking area configured to receive a laser mark from a laser; a laser access area formed from a second portion of the surface, the laser access area configured to provide the laser with access to the target marking area, the laser access area having a second surface texture different than the first surface texture, the second surface texture configuring the laser access area to disperse laser energy from the laser when the laser energy is received at the laser access area.

In some variations, a dental appliance may include: an appliance body, at least a portion thereof formed from a material that is transparent to laser energy to be used to mark the body, wherein; the appliance body has an interior surface to contact surfaces of the one or more teeth and an exterior surface; the appliance body has a target area for laser marking defined between the interior and exterior surfaces; and the appliance body has a laser access area defined on the a portion of the interior or exterior surface, wherein the laser access area has a rougher surface texture than an adjacent surface.

For example, a dental appliance may include: an appliance body, at least a portion thereof formed from a material that is transparent to laser energy used to mark the body; a target area for laser marking on the appliance body between an interior surface and an exterior surface of the appliance body; and a laser access area on the exterior surface of the appliance body, wherein the exterior surface at the laser access area has a rougher surface texture than a region of the exterior surface outside of the laser access area, wherein the rougher surface texture of the laser access area is configured to disperse laser energy from a laser beam as the laser beam interacts with the rougher surface texture.

The target marking area may be formed in an intermediate area between an exterior surface and an interior surface of the dental appliance. In some variations, the target marking area is configured to be near the molars and/or premolars when the device is worn by the patient.

The laser access area may be positioned over all or a portion of the target marking area (e.g., may be co-extensive with it) on the surface of the dental appliance. The laser access area may be on an interior surface of the dental appliance configured to contact the plurality of teeth and/or on an exterior surface of the dental appliance configured to face away from the plurality of teeth; the surface may be an outer surface of a transparent body of the dental appliance. For example, the laser access area may be on one or more of a molar and a premolar region of the dental appliance.

In general, the laser access area may be surrounded by regions having a different surface texture (e.g., a texture that is less roughening than the laser access area). In variations having more than one surface texture, the second surface texture may be rougher than the first surface texture. The laser access area may be a buccal side of the dental appliance.

The rougher surface texture of the laser marking area may be configured to disperse laser energy as the laser energy interacts with the rougher surface texture. The rougher surface texture of the laser marking location may be configured to interact with laser energy to disperse the laser energy at the target area for laser marking. The rougher surface texture of the laser marking location may be configured to interact with laser energy to disperse the laser energy such that it is absorbed at the target area for laser marking and none of the laser energy exits the interior surface. The rougher surface texture may be provided by a non-random pattern of surface features formed in the exterior surface. The rougher surface texture may be provided by a random pattern of surface features formed in the exterior surface. The rougher surface texture may be provided by a uniform pattern of surface features formed in the exterior surface. The uniform pattern may be configured to disperse laser energy at the target area in a manner based on the laser energy's interaction with the uniform pattern. The rougher surface texture of the laser access area may be configured to disperse laser energy from a laser beam at the target area. In some variations, the dispersed laser energy at the target area may be configured to promote heating of material outside of the target area. The dispersed laser energy at the target area may be configured to promote heating of material adjacent to the target area.

In any of these apparatuses, the dental appliance may have a body that is formed of a transparent material; the transparent material may be translucent.

As mentioned, any of these apparatuses may be configured so that the appliance body includes both a laser marking enhancing surface texture (e.g., the laser access area) on the surface and an inner particulate matter that assists in marking. For example, a dental appliance may include: an appliance body, at least a portion thereof formed from a material that is transparent to laser energy used to mark the body; a target area for laser marking defined between an interior surface and an exterior surface; a laser access area defined on the exterior surface, wherein the exterior surface at the laser access area has a patterned surface texture formed thereon that is configured to disperse laser energy from a laser beam within the target area; and a particulate material within the target area, the particulate material having laser energy absorption characteristics that are greater than that of the material forming the appliance body without the particulate material.

The particulate material may not be present within a region of the appliance body adjacent to the target area. The patterned surface texture may be any of those described above. As mentioned, the particulate material comprises a pigment or dye.

Also described herein are methods, including methods of forming any of the apparatuses described herein and/or methods of marking any of these apparatuses. For example, a method may include: forming, as part of a dental appliance (e.g., aligner) a target marking area configured to receive a laser mark from a laser; forming a laser access area on a portion of the surface of the dental appliance, wherein the laser access area is configured to provide the laser with access to the target marking area; the portion of the surface forming the laser access area may be formed of a first polymeric material having a first surface texture; other surface regions of the dental appliance may be formed having a second surface texture that is different than the first surface texture, the first surface texture may configure the laser access area to disperse laser energy from the laser when the laser energy is received at the laser access area.

In some variations, a method may include identifying a surface of a dental appliance, the surface having a first portion configured to interface with buccal and lingual regions of a patient, the surface including a plurality of tooth-receiving cavities to receive a corresponding plurality of teeth and to exert one or more orthodontic repositioning forces on the plurality of teeth; identifying a target marking area configured to receive a laser mark from a laser; identifying a laser access area to be formed on a second portion of the surface, the laser access area configured to provide the laser with access to the target marking area; forming the first portion of the surface with a first polymeric material having a first surface texture; forming the second portion of the surface with a second polymeric material, the second polymeric material having a second surface texture different than the first surface texture, the second surface texture configuring the laser access area to disperse laser energy from the laser when the laser energy is received at the laser access area.

For example, a method of forming a dental appliance may include: forming an appliance body from at least one material, at least a portion of the body being transparent to laser energy, and wherein the body is formed such that a target area for laser marking is defined between an interior surface and an exterior surface of the appliance body; defining a laser access area on at least one of the interior or exterior surface; and roughing the laser access area such to have a rougher surface texture than at least one of, a portion of the exterior surface that is not within the laser access area or a portion of the interior surface.

Any of these methods may be processes for forming a dental appliance, and may include, for example: forming an appliance body from at least one transparent material, at least a portion of the body being transparent to laser energy, and wherein the body is formed such that a target area for laser marking is defined between an interior surface and an exterior surface of the appliance body; and applying a roughing material to at least one of the interior surface and the exterior surface to rough at least a portion of the at least one surface. Alternatively or additionally to including roughening the surface (e.g., to form a laser access region) the method may include adding a particulate material (as described herein) in an intermediate region to be marked.

For example, a method may include: forming, as part of a dental appliance (e.g., a dental aligner), a target marking area on the dental appliance, the target marking area residing in an intermediate area residing between the exterior surface and the interior surface of the body of the dental appliance, wherein the body has a first laser absorption characteristic and the target marking area may be formed from a second region of polymeric material comprising a particulate matter interspersed with a polymeric material, so that the second region has a second laser absorption characteristic that is greater than the first laser absorption characteristic.

For example, a method may include: identifying an exterior surface of a dental appliance, the exterior surface configured to interface with buccal and lingual regions of a patient; identifying an interior surface of the dental appliance, the interior surface including a plurality of tooth-receiving cavities to receive a corresponding plurality of teeth and to exert one or more orthodontic repositioning forces on the plurality of teeth; identifying a target marking area on the dental appliance, the target marking area residing in an intermediate area residing between the exterior surface and the interior surface; forming the interior surface and the exterior surface from a first polymeric material, the first polymeric material having a first laser absorption characteristic; forming the laser access area from a second polymeric material comprising interspersed particulate matter interspersed with the first polymeric material, the second polymeric material having a second laser absorption characteristic greater than the first laser absorption characteristic.

The step of roughing at least a portion of the laser access area may include applying a chemical material to the laser access surface that interacts with the material forming the body to create the rougher surface texture. The step of roughing at least a portion of the laser access area may include applying an abrasive material against the laser access surface that interacts with the material forming the body to create the rougher surface texture. In some variations, roughing at least a portion of the laser access area includes applying a patterned shape against the laser access surface that interacts with the material forming the body to create the rougher surface texture. In some variations, roughing at least a portion of the laser access area includes applying a random shape against the laser access surface that interacts with the material forming the body to create the rougher surface texture. In some variations, roughing at least a portion of the laser access area includes applying a shaped material against the laser access surface that interacts with the material forming the body to create the rougher surface texture and wherein the method further includes heating the material forming the body to conform the exterior surface to a shape of a surface of the shaped material.

In some variations, the roughing material is a chemical material that interacts with the transparent material (e.g., the material forming the device body) to rough at least one of the interior surface and the exterior surface. The roughing material may be an abrasive material that interacts with the transparent material to rough at least one of the interior surface and the exterior surface. The roughing material may be a patterned form that interacts with the transparent material to rough at least one of the interior surface and the exterior surface.

Any of these methods may include forming an appliance body by thermoforming the appliance body from a sheet of material placed over a mold of a patient's teeth based on an arrangement of the teeth determined by a treatment plan. In some variations, forming an appliance body includes printing the appliance body based on an arrangement of the teeth determined by a treatment plan.

Also described herein are apparatuses (and methods of forming and/or marking them) that include a material (e.g., a particulate material) that is included within the body of at least a region of the dental apparatus to enhance marking. In some variations this particulate material may be disbursed within the marking region between the inner and outer surfaces of the dental apparatus. In some variations the particulate material is distributed or concentrated within a layer or inner region of the marking region. As mentioned above, these devices may include or not include a surface texture for enhancing laser marking.

For example, described herein are dental appliances, comprising: an appliance body formed from at least one material and at least a portion of the body being transparent to laser energy, wherein; the body having an interior surface to contact surfaces of the one or more teeth and an exterior surface, and a first target area for laser marking within the body between the interior and exterior surfaces; and the first target area within the body contains a quantity of at least one particulate material interspersed within the first target area, the at least one particulate material having laser energy absorption characteristics that are greater than that of the material used to form the body without the at least one particulate material.

For example, a dental appliance may include: an appliance body formed from at least one material wherein at least a portion of the body is transparent to laser energy, wherein; an interior surface on the appliance body configured to contact surfaces of the one or more teeth and an exterior surface, and a first target area of the appliance body for laser marking within the body between the interior and exterior surfaces; and a means for increasing one or more laser energy absorption characteristics that are present in the at least one material that is transparent to laser energy.

A dental appliance may include: an exterior surface formed from a first polymeric material, the first polymeric material having a first laser absorption characteristic, the exterior surface configured to interface with buccal and lingual regions of a patient; an interior surface formed from the first polymeric material, the interior surface including a plurality of tooth-receiving cavities to receive a corresponding plurality of teeth and to exert one or more orthodontic repositioning forces on the plurality of teeth; an intermediate area residing between the exterior surface and the interior surface, the intermediate area including a target marking area formed from a second polymeric material comprising interspersed particulate matter interspersed with the first polymeric material, the second polymeric material having a second laser absorption characteristic greater than the first laser absorption characteristic.

For example, a dental appliance may include: an appliance body, at least a portion thereof being transparent to laser energy used by a laser that directs laser energy at the appliance body to conduct laser marking and the body having a plurality of cavities therein designed to receive one or more teeth of a jaw of a patient and the plurality of cavities providing force to reposition at least one tooth of the jaw with respect to at least one other tooth of the jaw, wherein; the body has an interior surface to contact surfaces of the one or more teeth and an exterior surface; and the body is formed such that a first target area for laser marking is defined within the body between the interior and exterior surfaces; and the first target area within the body contains a first quantity of a first particulate material interspersed within the first target area, the first particulate material having laser energy absorption characteristics that are greater than that of material forming portions of the body outside of the first target area.

As mentioned, the particulate material may comprise a pigment or dye. A quantity of first particulate material may be interspersed within the materials forming the entire body; alternatively, the first particulate material may be restricted to a region to be marked (including as sub-region, such as within an internal layer).

The material of the body may be formed such that a second target area for laser marking is defined within the body between the interior and exterior surfaces, and the second target area within the body may contain a quantity of second particulate material interspersed within the second target area. The body may be formed from multiple layers and the first target area may be within a first layer and wherein material of the body is formed such that a second target area for laser marking is defined within a second layer of the body between the interior and exterior surfaces, and the second target area within the body may contain a quantity of second particulate material interspersed within the second target area.

The first target area within the body may contains a quantity of a second particulate material interspersed within the first target area. The first particulate material may have a heightened reactivity to a first range of wavelengths of laser energy as compared to a second range of wavelengths. The second particulate material may have a heightened reactivity to a second range of wavelengths of laser energy that is a different range of wavelengths than the first range of wavelengths.

In any of these dental appliances, the dental appliance may be one of a series of removable polymeric orthodontic appliances. The interspersed particulate matter may comprise one or more of an additive, a filler, a pigment, and a dye. The first quantity of first particulate material may be interspersed within the first target area and a second quantity of the at least one particulate material may be interspersed in a portion of the material of the body that is outside the first target area. The first target area within the body of the dental appliance may contain a quantity of a second particulate material interspersed within the first target area. The second particulate material may have a different average particle size than the first particulate material. The second particulate material may have a different average particle density as it is dispersed throughout the body than the first particulate material.

BRIEF DESCRIPTION OF THE DRAWINGS

Novel features of embodiments described herein are set forth with particularity in the appended claims. A better understanding of the features and advantages of the embodiments may be obtained by reference to the following detailed description that sets forth illustrative embodiments and the accompanying drawings.

FIG. 2B illustrates a method for forming a dental appliance according to some implementations.

FIG. 2C illustrates a method for forming a dental appliance according to some implementations.

FIG. 9 illustrates a non-transitory computer readable medium having instructions for forming a dental appliance according to a number of embodiments of the present disclosure.

DETAILED DESCRIPTION

Existing techniques make it difficult to mark dental appliances, such as orthodontic aligners with marks. This may be due to various reasons, including the limitations of aligner materials and the rigorous demands of an intraoral cavity. Various implementations feature a dental appliance (e.g., an orthodontic aligner), at least a portion of which is formed from materials that facilitate improved laser marking. As noted herein, a laser mark on a dental appliance formed according to various implementations may withstand the humidity, temperature, and other demands of an intraoral environment. The laser mark may be formed by "laser energy," which as used herein, may include any light (e.g., visible, non-visible, etc.) and/or laser. Laser energy need not be visible light.

Figure 1:
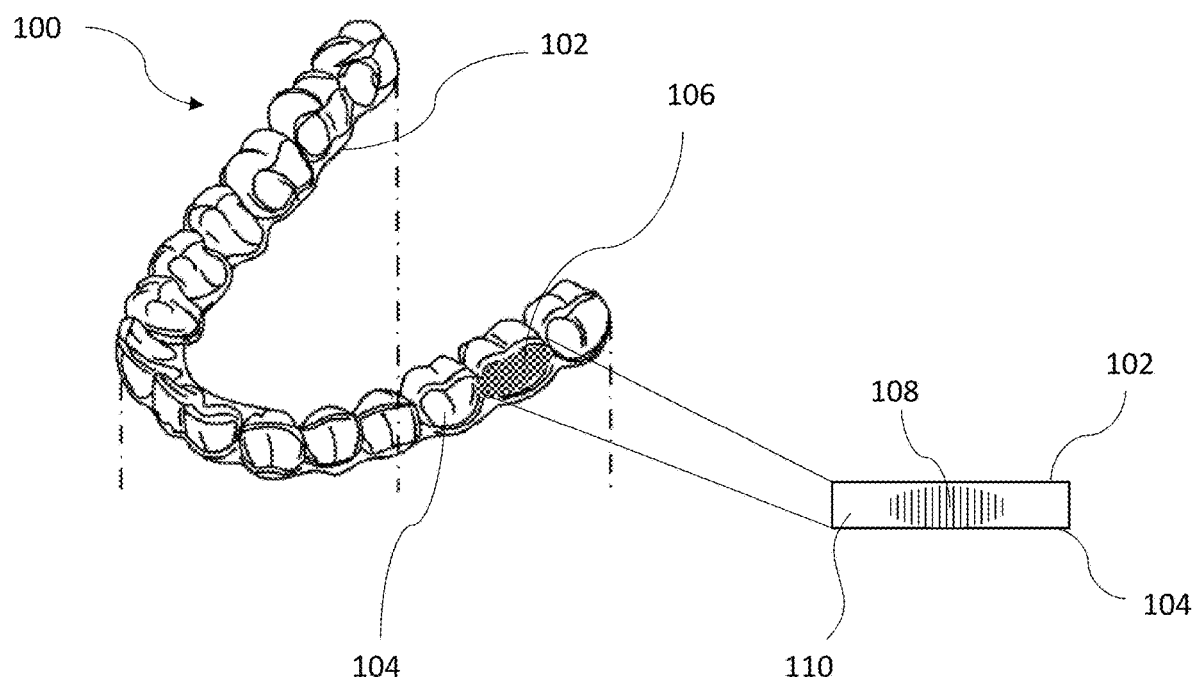
FIG. 1 illustrates a perspective view of a dental appliance according to one or more embodiments of the present disclosure.

FIG. 1 shows an example of a dental appliance 100, according to some implementations. The dental appliance 100 includes an interior surface 102 and an exterior surface 104. The interior surface 102 may be a cavity-receiving surface of the dental appliance 100 and may include a plurality of tooth-receiving cavities to receive teeth of a dentition of a patient and exert repositioning forces thereto. The exterior surface 104 may comprise a buccal and/or lingual surface of the dental appliance 100.

The dental appliance 100 may include an appliance body (not labeled in FIG. 1). The dental appliance 100 may include a laser access area 106 and a target marking area 108. In this example of FIG. 1, the laser access area 106 is formed on the body of the appliance, shown in FIG. 1 as formed from the exterior surface 104. However, it is noted that such an illustration is by way of example only, and in various implementations, the laser access area 106 may be formed on the interior surface 102 of the dental appliance 100.

The laser access area 106 in FIG. 1, and any "laser access area" as used herein, may include a physical region of the dental appliance 100 that allows a laser or other light energy to access a part of the dental appliance 100 in order to mark the dental appliance 100. The laser access area 106 may have a surface texture that is different than the surface texture of another area of the dental appliance 100. "Surface texture," as used herein, may include a property of a surface characterized by lay, surface roughness, waviness, or some combination thereof. Surface texture may comprise small and/or local deviations of a surface from an ideal plane or flat surface. Surface roughness may include deviations in a direction of a normal vector from the normal vectors of an ideal plane or flat surface. Large deviations may correspond to a "rougher" surface (of greater surface roughness) while smaller deviations may correspond to a "smoother surface" (of lesser surface roughness). Waviness may include deviations due to, e.g., machine or work deflections, chatter, residual stress, vibrations, and/or heat treatment. As an example of different surface textures, the laser access area 106 may have a surface roughness that is greater than a surface roughness of other parts of the dental appliance 100. The surface texture of the laser access area 106 may be characterized by a larger number of deviations in the direction of normal vector(s) from its surface than the number of deviations in the direction of the normal vector from the surface of other areas of the dental appliance 100. In some implementations, the surface roughness of the laser access area 106 may be greater than the surface roughness of surrounding and/or other areas of the exterior surface 104. The surface roughness of the laser access area 106 may also be greater than the surface roughness of portions of the interior surface 102.

A laser access area may be on a buccal side or a lingual side and may be limited to a region over the premolar and/or molars. In some variations, it may be beneficial for a laser access region to be on the buccal side near the molar and/or premolar region.

The laser access area 106 may be configured to disperse laser energy provided to it. Dispersal of laser energy through the laser access area 106 (e.g., through the higher surface roughness of the laser access area) may allow the laser energy to be better absorbed at the target marking area 108 than it would were the laser access area 106 had a lower surface roughness. This may prevent a significant portion of the laser energy from exiting the target marking area 108 and/or may reduce damage to the target marking area 108. The rougher surface texture of the laser marking area 106 may also reduce damage or unintended marks on the target marking area 108.

In some embodiments, the rougher surface texture can be provided by a non-random (e.g., uniform) pattern of surface features formed in the exterior surface 104 and/or the interior surface 102. The non-random pattern of surface features can be configured to disperse laser energy at the target marking area 108 in a manner based on the laser energy's interaction with the non-random pattern. As used herein, a non-random pattern can include a pattern that conforms to one or more deterministic relationships (repeating patterns, organized patterns, patterns that can be modeled by parametric functions, etc.). A random pattern as used herein can include patterns that do not conform to deterministic relationships (e.g., are non-repeating, have surface features that are not deterministically placed with respect to each other, etc.).

In some embodiments, a rougher surface area can be provided by a random pattern of surface features formed in the exterior surface 104 or the interior surface 102. A random pattern of surface features can be configured to disperse laser energy at the target marking area 108 in a manner based on the laser energy's interaction with the random pattern.

Surface features formed in the exterior surface 104 and/or the interior surface 102 of the dental appliance 100 can include height variations, translucency variations, and density variations, among other surface features. The term "translucent," as used herein, may include a property of a material that allows light energy to pass through. A translucent material may also be "transparent," which, as used herein, may include a property of material that allows light energy to pass through so that objects behind the material can be seen.

The surface features can be configured to promote heating in one or more particular areas of the target marking area 108 when the laser energy is applied to the dental appliance 100 by the laser marking source. The particular areas of the target marking area 108 that are heated when the laser energy is applied can be the areas within the target marking area 108 that are laser marked. Additionally, the dispersed laser energy at the target marking area 108 can be configured to promote heating of material outside of and/or adjacent to the target marking area 108 in addition to within the target area, in some embodiments. In some embodiments, the laser access area may be sensitized to the laser energy (e.g., by the surface features or otherwise, as described herein) as compared to other regions of the aligner outside of the laser access area, for visibly marking by the laser.

In some implementations, the laser access area 106 can be defined on the interior surface 102 or the exterior surface 104. In these implementations, the laser access area 106 may align with the target marking area 108, and the target marking area 108 may be defined between the interior surface 102 and the exterior surface 104 of the dental appliance 100. Such alignment may cause laser energy to pass through the laser access area 106 before the laser energy enters the target marking area 108. In various embodiments, the laser access area 106 can be defined on the interior surface 102 of the dental appliance 100. As noted herein, an example interior laser access area can have a rougher surface texture than the portions of the appliance that are outside of the interior laser access area.

The target marking area 108 and any "target marking area" as used herein, may include a physical region configured to receive and/or be marked with a laser mark. The target marking area 108 may be formed in an intermediate area 110 of the dental appliance 100. The intermediate area 110 may comprise a portion of a body of the dental appliance 100 and may reside between the interior surface 102 and the exterior surface 104. In various implementations, the target marking area 108 may have laser radiation absorption characteristics that are greater the laser radiation absorption characteristics of other portions of the dental appliance 100. A "laser radiation absorption characteristic," as used herein, may include the ability of that material to absorb photons of laser radiation. A laser radiation absorption characteristic of a material may, but need not, relate to the relative transparency of the material in relation to laser radiation. Laser radiation absorption characteristics of material may relate to the ability of the material to interact with photons of laser radiation, e.g., at the atomic level. Laser radiation absorption characteristics of a material may relate to the ability of the material to transform photons of laser radiation to internal energy, e.g., thermal energy, within the material. In some implementations, materials with higher laser radiation absorption characteristics may attenuate photons of laser radiation more greatly than materials with lower laser radiation absorption characteristics. It is noted laser radiation absorption may relate to linear absorption, non-linear absorption, and/or absorption characterized by other functions of photons. Additionally, while FIG. 1 shows the target marking area 108 formed in the intermediate area 110, in various implementations, the target marking area 108 may be formed in the interior surface 102, the exterior surface 104, the intermediate area 110, and/or any combination thereof.

In some implementations, the target marking area 108 may be formed from a substantially transparent and/or translucent material. It is noted "transparent," "translucent," and/or other optical properties of a material may be defined relative to a light source. E.g., a material may be "transparent," or "translucent" to non-visible light but may still be opaque to visible light. In some embodiments, the target marking area 108 may be formed from a light transmissive material to allow light from a laser marking source to it. The target marking area 108 for laser marking can be defined between the interior surface 102 and an exterior surface 104 of the dental appliance 100. The target marking area 108 for laser marking can be the laser marking location within the dental appliance 100 where the laser marking will appear.

In some implementations, the target marking area 108 can contain particulate material with laser radiation absorption characteristics that are greater than the laser radiation absorption characteristics of other portions of the dental appliance 100. "Particulate matter," as used herein, may include solid and/or liquid matter (e.g., microscopic solid and/or liquid matter) interspersed in dental appliance material (e.g., interspersed in the polymeric materials of the dental appliance). Examples of particulate matter include, e.g., additives, fillers, pigments, and dyes that enhance the absorption of laser energy for localized color changes.

In some implementations, laser radiation absorption characteristics of the target marking area 108 may be greater than laser radiation absorption characteristics of substantially transparent material(s) used to form the dental appliance 100. The laser radiation absorption characteristics of the target marking area 108 may allow for increased marking quality, including increased marking contrast, line edged detail, and/or marking speed on the dental appliance 100.

The dental appliance 100 may interact with laser radiation and/or other forms of radiation in order to accurate laser marks on appliance 100 and/or laser marks that do not damage portions of the dental appliance 100. As noted herein, the dental appliance 100 may interact with laser radiation and/or other forms of radiation in order to accurately receive laser marks on appliance 100 and/or laser marks that do not damage portions of the dental appliance 100. The relatively rough surface texture of the laser access area 106 (e.g., relative to other portions of the dental appliance 100) may cause laser energy directed to it to disperse. Such dispersal may cause the laser energy to be more efficiently absorbed by the target marking area 108 so that very little of the laser energy exits (e.g., is reflected from) the target marking area 108. In an example implementation where the laser access area 106 is defined on an exterior surface 104 of the appliance 102, the laser access area 106 can have a rougher surface texture than at least one other portion of the appliance that is outside of the exterior laser access area 106. Directing light from the laser marking source at the exterior laser access area 104 with the rougher surface texture can disperse the laser energy from the light such that it is absorbed at the target marking area 108 for laser marking and little or none of the laser energy exits the interior surface 102 of the dental appliance 100. As an example, directing light from the laser marking source at the exterior laser access area 104 with the rougher surface texture can disperse the laser energy from the light such that it is absorbed at the target marking area 108 for laser marking and less than a threshold amount of laser energy (e.g., less than a specific number of Watts (W) of laser energy) exits the interior surface 102 of the dental appliance 100. In some embodiments, the laser energy can be reduced or in som0065 cases fully absorbed at the target marking area 108, eliminating excess laser energy which can damage the portions of the dental appliance 100 outside of the target marking area 108 and improve the quality of the laser marking.

The technology of the described implementations may make it easier to correctly sequence orthodontic aligners during various phases, including production and/or application of orthodontic aligners to treat patients. Use of laser marks on the dental appliance 100 may allow an appropriate dental appliance to be used in the correct sequence and/or is specific to a particular user. Laser marking may be used to mark the dental appliance 100 with a label, (a numerical number, an alphanumeric sequence, design, etc.), to indicate the sequence that the dental appliance 100 is implemented. Markings can also include patient readable information, such as a patient ID and stage, among other information. In some embodiments, such information can be used during manufacture to keep the appliances in the correct order or to keep a set of appliances together, in preparation for shipping to the patient or treatment professional.

It is noted the dental appliance 100 may represent one of a plurality of incremental dental position adjustment appliances. The dental position adjustment appliances can be utilized to incrementally implement a treatment plan for the movement of teeth on the jaws of the patient such as by affecting incremental repositioning of individual teeth in a jaw on which the appliance is placed, among other suitable uses. The dental position adjustment appliances can be fabricated according to a virtual dental model that has had positions of a number of teeth adjusted from their current position in a patient's mouth, to allow the teeth to move to the adjusted positions.

The dental appliance 100 may, but need not, be fabricated from a polymeric shell, and/or formed from other material, having a plurality of cavities therein. The cavities can be designed (e.g., shaped) to receive one or more teeth and/or apply force to reposition one or more teeth of a jaw from one teeth arrangement to a successive teeth arrangement. The shell may be designed to fit over a number of, or in many instances all, teeth present in the upper and/or lower jaw. The shell can include an interior surface 102 (e.g., adjacent to a surface of the teeth placed therein) to contact surfaces of one or more teeth and an exterior surface 104.

In some implementations, the dental appliance 100 need not be a tooth repositioning appliance. The dental appliance 100 may include any positioners, retainers, restorative appliances, and/or other removable appliances for finishing and maintaining teeth positioning or provide other functionalities to a patient, such as aiding in sleep apnea or bruxism, in connection with a dental treatment. These appliances may be utilized by a treatment professional in performing a treatment plan. For example, a treatment plan can include the use of a set of appliances, created according to models described herein.

Figure 2A:
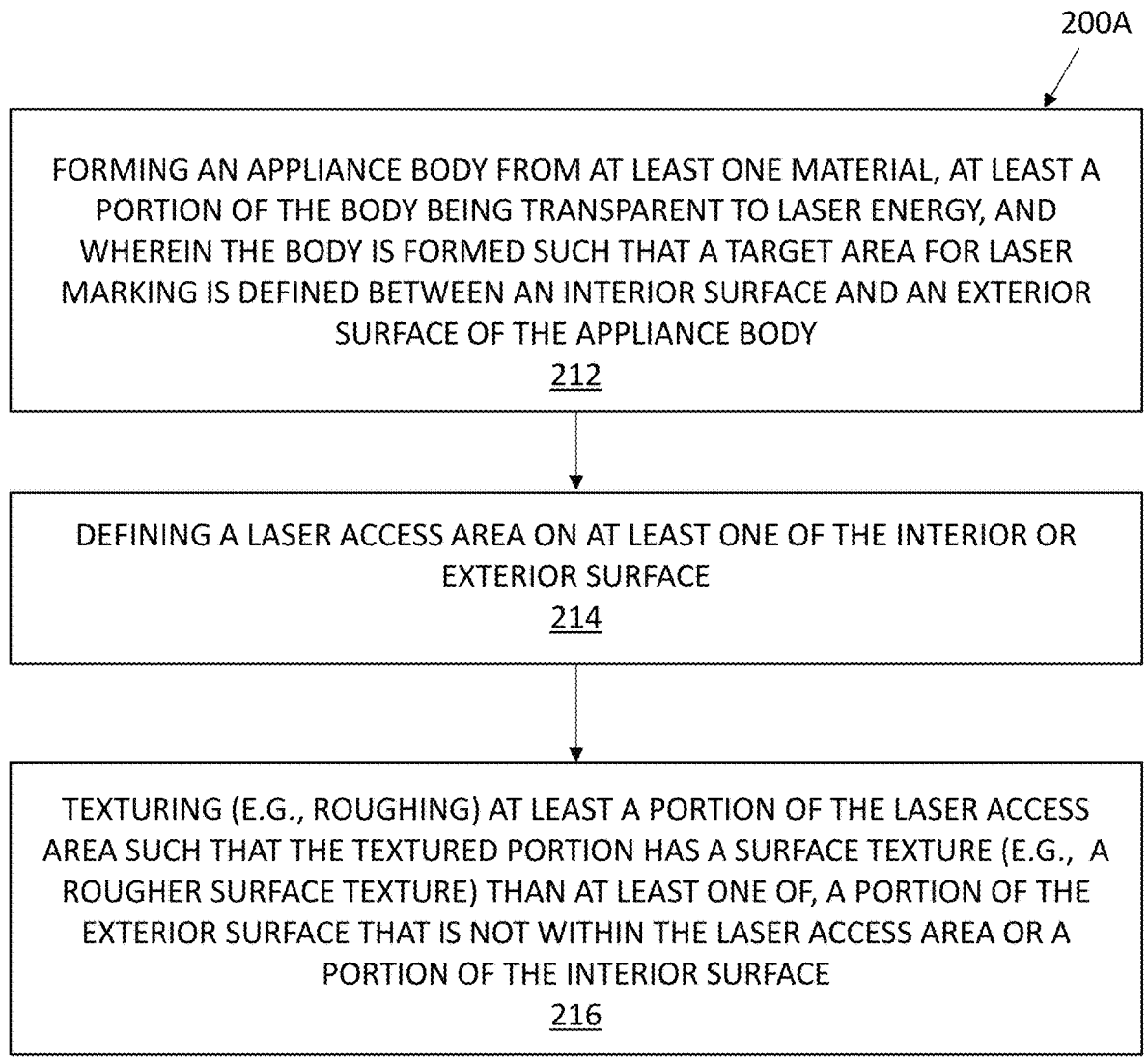
FIG. 2A illustrates a method for forming a dental appliance according to a number of embodiments of the present disclosure.

FIG. 2A illustrates a flowchart of a method 200A for forming a dental appliance according to some implementations. The method 200A may include more or less operations than those explicitly shown in FIG. 2A. Some or all of the operations of the method 200A may be executed by the computing system 650 and/or other structures shown in FIG. 6. The method 200A may be used for forming the dental appliance 100 shown in FIG. 1.

At an operation 212, forming the dental appliance can include forming an appliance body from at least one material, at least a portion of the body being transparent to laser energy. As previously described, the appliance can be fabricated from a polymeric shell, and/or formed from other material, having a plurality of cavities therein.

The cavities can be designed (e.g., shaped) to receive one or more teeth and/or apply force to reposition one or more teeth of a jaw from one teeth arrangement to a successive teeth arrangement. The shell may be designed to fit over a number of, or in many instances all, teeth present in the upper and/or lower jaw. The shell can include an interior surface (e.g., adjacent to a surface of the teeth placed therein) to contact surfaces of one or more teeth and an exterior surface.

In an embodiment, the appliance body can be fabricated from a transparent (e.g., translucent) material for improved laser marking. In some embodiments, the dental appliance 102 may be formed from a light transmissive material to allow light (e.g., a laser beam) from the light source to mark the transparent material of the dental appliance 102. However, in some embodiments, the light used to mark the dental appliance 102 may not be visible light and, in such embodiments, the material may be transparent to the type of non-visible light that is being used for marking the dental appliance (e.g., ultraviolet (UV) light, infrared light, etc.).

Further, the body of the appliance can be formed such that a target area for laser marking is defined between an interior surface and an exterior surface of the appliance body. The target area for laser marking can be the laser marking location within the appliance. The laser marking can include objects imprinted (e.g., marked) into the material of the appliance, such as appliance and/or patient identification information or decorative marking, such as brand logos or object (e.g., a flower design) selected by a patient.

Laser energy can be dispersed at the target area to promote modification (e.g., by heating) of the material resulting in the imprinting of the object into the appliance. In some embodiments, the laser marking (e.g., the imprinted object) can be colored, as will be discussed in more detail below.

In some embodiments, as described herein, at least a portion of the area between the interior and exterior surface can include a quantity of particulate material that is configured to absorb the light energy that interacts with the textured surface and directed to the portion of the area between the interior and exterior surface. By absorbing the laser energy, the particulate material can help form a higher quality laser maser mark than would be defined within the appliance if there was excess laser energy. The (e.g., roughened) surface texture and/or the particulate interspersed within the target area of the appliance can, in some embodiments, allow for portions outside of the target area and the laser access area to remain unaffected (e.g., smooth) after laser marking. Additionally or alternatively, directing and absorbing the light energy at the target area can result in laser markings with high contrast and sharp edge details. Thus, the reading efficiency of the laser marking can be improved.

At an operation 214, forming the dental appliance can further include defining a laser access area on at least one of the interior or exterior surface. The laser access area can be defined on an interior surface or an exterior surface that aligns with the target area defined between the interior surface and the exterior surface of the appliance allowing the laser energy of the light from a laser marking source to be dispersed at the target area for laser marking.

At an operation 216, forming the dental appliance can further include roughing at least a portion of the laser access area such that the roughed portion has a rougher surface texture than at least one of, a portion of the exterior surface that is not within the laser access area or a portion of the interior surface. Roughing can, for example, be the application of a number of surface features to an exterior portion of the appliance causing the roughed (e.g. not smooth) exterior portion of the appliance to have a rougher surface texture than at least one of, a portion of the virtual exterior surface that is not within the laser access area or a portion of the virtual interior surface where roughing has not occurred.

Roughing at least a portion of the laser access area can include applying a roughing material to at least a portion of the laser access area on the interior surface or the exterior surface of the appliance. For example, roughing at least a portion of the laser access area can include applying a chemical material to the laser access surface that interacts with the material (e.g., a transparent material) forming the body of the appliance to create the rougher surface texture, applying an abrasive material (e.g., sand paper, a bur tool, etc.) against the laser access surface that interacts with the material forming the body of the appliance to create the rougher surface texture, applying a patterned shape (e.g., an embossing stamp with the shaped formed thereon) against the laser access surface, applying a random shape against the laser surface that interacts with the material forming the body of the appliance to create the rougher surface texture, and applying a shaped material against the laser access surface that interacts with the material forming the body of the appliance to create the rougher surface texture, among other methods of creating the rougher surface texture. Applying the shaped material against the laser access surface that interacts with the material forming the body of the appliance to create the rougher surface texture can also include heating the material forming the body to aid in conforming the exterior surface to a shape of a surface of the shaped material applied to the exterior surface.

Texturing (e.g., roughing) at least a portion of the laser access area can result in surface features (e.g., height variations, translucency variations, density variations, etc.) which can promote heating in one or more particular areas of the target area when the laser energy is applied to the appliance. Additionally, texturing (e.g., by roughening) at least a portion of the laser access can allow the surface features of the textured portion of the appliance to disperse the laser energy at the target area in a manner based on the laser energy's interaction with the surface features of the roughed portion of the appliance. The laser energy can be dispersed such that it is absorbed at the target area and none of the laser energy exits an exterior surface of the appliance.

FIG. 2B illustrates a flowchart of a method 200B for forming a dental appliance according to some implementations. The method 200B may include more or less operations than those explicitly shown in FIG. 2B. Some or all of the operations of the method 200B may be executed by the computing system 650 and/or other structures shown in FIG. 6. The method 200B may be used for forming the dental appliance 100 shown in FIG. 1.

At an operation 221, a target marking area on a dental appliance for marking the dental appliance with a laser mark may be identified. As an example, the target marking area 108 on the dental appliance 100 may be identified. In various implementations, the target marking area is identified on a computer system either with an automated agent or an individual identifying a virtual representation of the target marking area. The target marking area may also be identified by a machine or an individual identifying an area of a dental appliance. The target marking area may comprise a portion of an intermediate area, an interior area, an exterior area, or some combination thereof of the dental appliance 100. The target marking area may include a laser mark. The laser mark may represent, e.g., appliance and/or patient identification information, decorative marking, brand logos, designs, patient-selected information/decorations, etc.

At an operation 223, a laser access area on the dental appliance that corresponds to a region of the dental appliance that provides laser access to the target marking area may be identified. To continue the foregoing example, the laser access area 106 on the dental appliance 100 may be identified. The laser access area may be identified on a computer system either with an automated agent or an individual identifying a virtual representation of the laser access area. The laser access area may also be identified by a machine or an individual identifying an area of a dental appliance. The laser access area may comprise a portion of an interior area or an exterior area of the dental appliance that resides proximate to the target marking area.

At an operation 225, a surface texture of the laser access area may be formed to disperse laser energy provided to the laser access area. The laser access area may comprise an area having a surface texture different (e.g., rougher) than the surface texture of other portions of the dental appliance, such as areas of the dental appliance surrounding and/or proximate to the laser access area. A machine or a human operator may achieve the different surface texture by abrading, roughing, etc. the surface of the laser access area relative to other areas of the dental appliance. A machine or a human operator may achieve the different surface texture by including an affirmative manufacturing step to form the laser access area from a different (e.g., rougher) material than other areas of the dental appliance so that the laser access area causes laser energy to disperse through it. Forming the laser access area may include using thermoforming techniques over a physical mold (e.g., a 3D printed mold) and/or direct fabricating/3D printing the laser access area to have a differing surface texture than other areas of the dental appliance.

FIG. 2C illustrates a flowchart of a method 200C for forming a dental appliance according to some implementations. The method 200C may include more or less operations than those explicitly shown in FIG. 2C. Some or all of the operations of the method 200C may be executed by the computing system 650 and/or other structures shown in FIG. 6. The method 200C may be used for forming the dental appliance 100 shown in FIG. 1.

At an operation 227, a target marking area on a dental appliance for marking the dental appliance with a laser mark may be identified. As an example, the target marking area 108 on the dental appliance 100 may be identified. In various implementations, the target marking area is identified on a computer system either with an automated agent or an individual identifying a virtual representation of the target marking area. The target marking area may also be identified by a machine or an individual identifying an area of a dental appliance. The target marking area may comprise a portion of an intermediate area, an interior area, an exterior area, or some combination thereof of the dental appliance 100. The target marking area may include a laser mark. The laser mark may represent, e.g., appliance and/or patient identification information, decorative marking, brand logos, designs, patient-selected information/decorations, etc.

At an optional operation 229, a laser access area on the dental appliance that corresponds to a region of the dental appliance that provides laser access to the target marking area may be identified. As noted herein, the laser access area 106 on the dental appliance 100 may be identified. The laser access area may be identified on a computer system either with an automated agent or an individual identifying a virtual representation of the laser access area. The laser access area may also be identified by a machine or an individual identifying an area of a dental appliance. The laser access area may comprise a portion of an interior area or an exterior area of the dental appliance that resides proximate to the target marking area.

At an operation 231, the target marking area may be formed with interspersed particulate matter having particulate properties different than particulate properties of other portions of the dental appliance. As noted herein, a machine or a human operator may design the target marking area to have particulate matter interspersed throughout it. In some implementations, a machine or human operator may incorporate a mix of materials in an intermediate area of the dental appliance that is between interior and exterior areas of the dental appliance. The mix of materials may include particulate matter interspersed with the polymer materials used for other portions of the dental appliance. The mix of materials may be used to lay out a portion of a thermoformed aligner. In some implementations, the target marking area may be formed by direct fabrication/3D printing techniques. As an example, the target marking area may be formed layer-by-layer by 3D printing techniques.

Figure 2D:
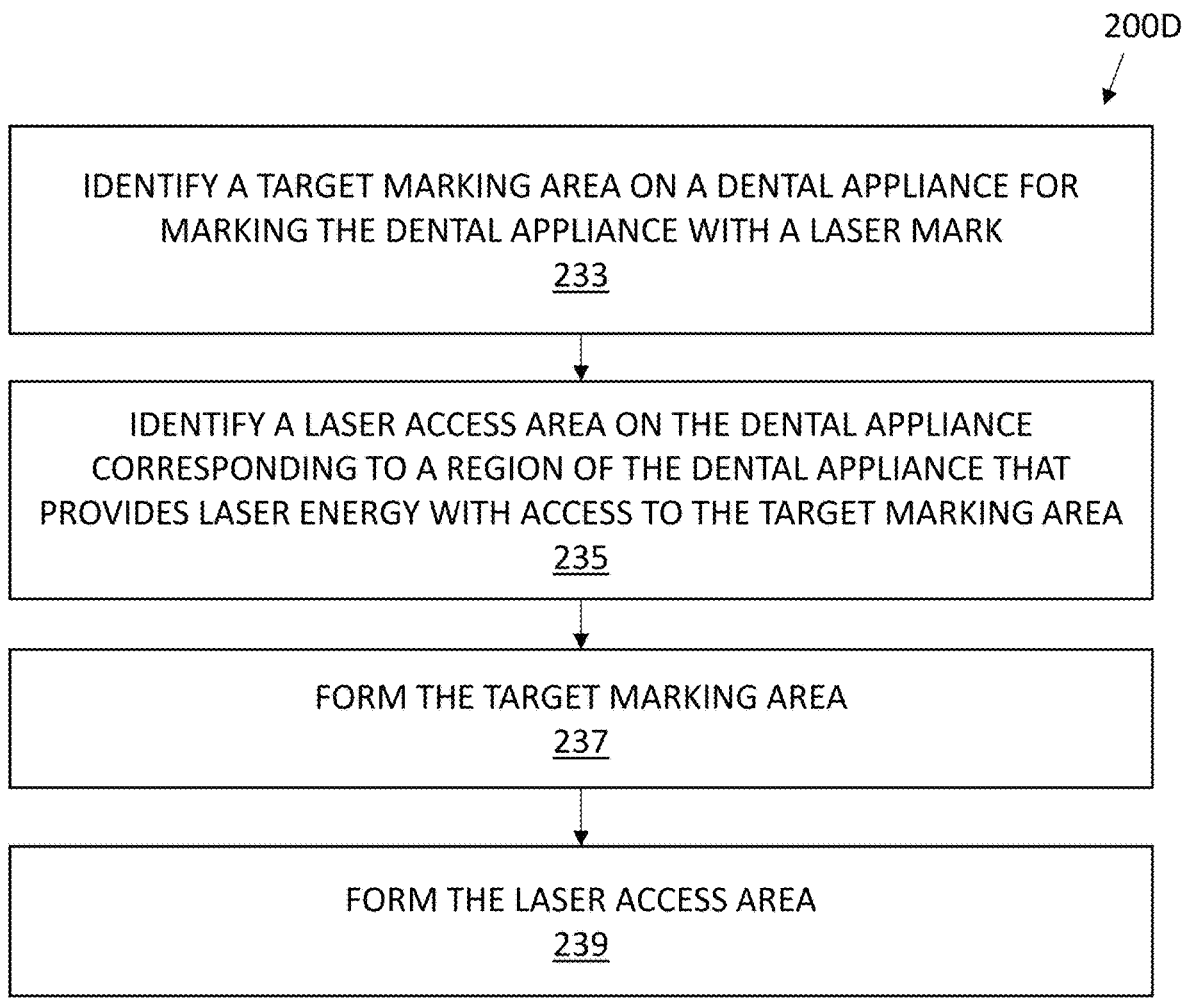
FIG. 2D illustrates a method for forming a dental appliance according to some implementations.

FIG. 2D illustrates a flowchart of a method 200D for forming a dental appliance according to some implementations. The method 200D may include more or less operations than those explicitly shown in FIG. 2D. Some or all of the operations of the method 200D may be executed by the computing system 650 and/or other structures shown in FIG. 6. The method 200D may be used for forming the dental appliance 100 shown in FIG. 1.

At an operation 233, a target marking area on a dental appliance for marking the dental appliance with a laser mark may be identified. As an example, the target marking area 108 on the dental appliance 100 may be identified. In various implementations, the target marking area is identified on a computer system either with an automated agent or an individual identifying a virtual representation of the target marking area. The target marking area may also be identified by a machine or an individual identifying an area of a dental appliance. The target marking area may comprise a portion of an intermediate area, an interior area, an exterior area, or some combination thereof of the dental appliance 100. The target marking area may include a laser mark. The laser mark may represent, e.g., appliance and/or patient identification information, decorative marking, brand logos, designs, patient-selected information/decorations, etc.

At an operation 235, a laser access area on the dental appliance that corresponds to a region of the dental appliance that provides laser access to the target marking area may be identified. As noted herein, the laser access area 106 on the dental appliance 100 may be identified. The laser access area may be identified on a computer system either with an automated agent or an individual identifying a virtual representation of the laser access area. The laser access area may also be identified by a machine or an individual identifying an area of a dental appliance. The laser access area may comprise a portion of an interior area or an exterior area of the dental appliance that resides proximate to the target marking area.

At an operation 237, the target marking area may be formed. A machine or a human operator may design the target marking area to have particulate matter interspersed throughout it. In some implementations, a machine or human operator may incorporate a mix of materials in an intermediate area of the dental appliance that is between interior and exterior areas of the dental appliance. The mix of materials may include particulate matter interspersed with the polymer materials used for other portions of the dental appliance. The mix of materials may be used to lay out a portion of a thermoformed aligner. In some implementations, the target marking area may be formed by direct fabrication/3D printing techniques. As an example, the target marking area may be formed layer-by-layer by 3D printing techniques.

At an operation 239, the laser access area may be formed. The laser access area may comprise an area having a surface texture different (e.g., rougher) than the surface texture of other portions of the dental appliance, such as areas of the dental appliance surrounding and/or proximate to the laser access area. A machine or a human operator may achieve the different surface texture by abrading, roughing, etc. the surface of the laser access area relative to other areas of the dental appliance. A machine or a human operator may achieve the different surface texture by including an affirmative manufacturing step to form the laser access area from a different (e.g., rougher) material than other areas of the dental appliance so that the laser access area causes laser energy to disperse through it. Forming the laser access area may include using thermoforming techniques over a physical mold (e.g., a 3D printed mold) and/or direct fabricating/3D printing the laser access area to have a differing surface texture than other areas of the dental appliance.

Figure 3:
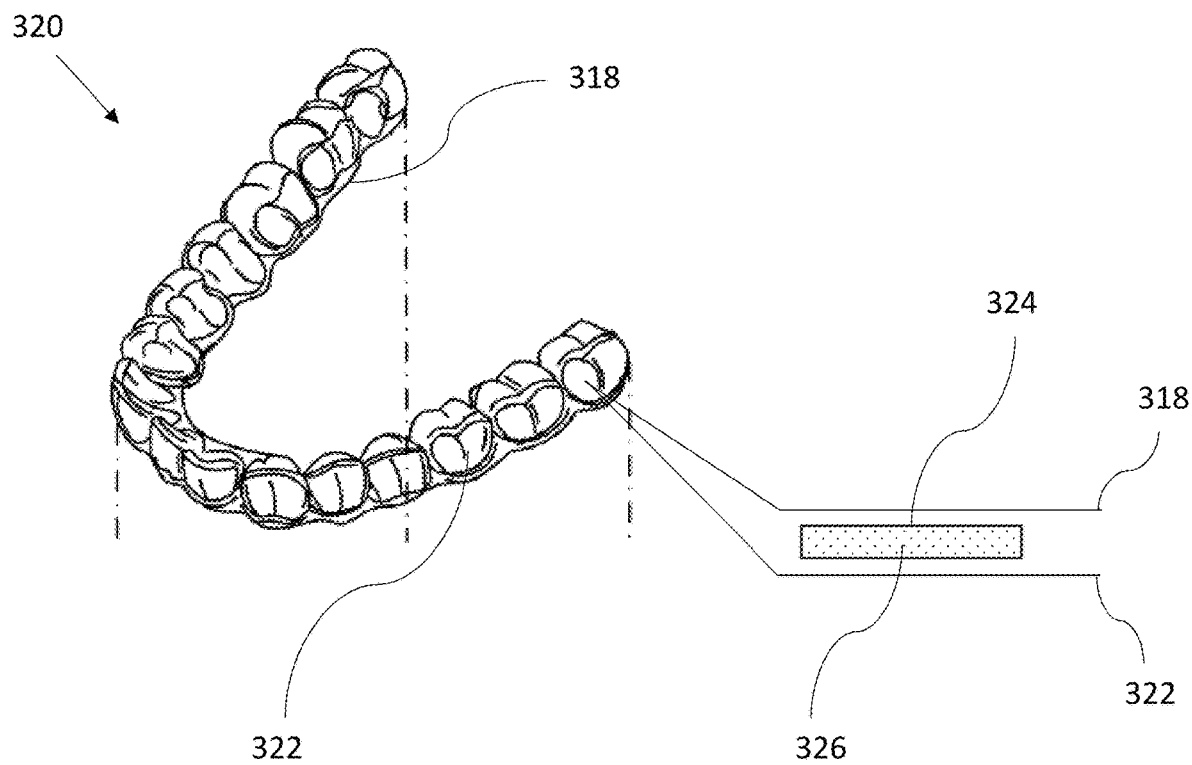
FIG. 3 illustrates another perspective view of a dental appliance according to one or more embodiments of the present disclosure.

FIG. 3 illustrates another perspective view of a dental appliance 320 according to one or more embodiments of the present disclosure. The appliance 320 can include an appliance body, where at least a portion of the appliance body is formed from a transparent (e.g., translucent) material for improved laser marking. In some embodiments, the dental appliance 320 may be formed from a light transmissive material to allow light (e.g., a laser beam) from a light source (e.g., a laser) to mark the transparent material of the dental appliance 320. However, in some embodiments, the light used to mark the dental appliance 320 may not be visible light (e.g., wavelengths between about 390 and 700 nm) and, in such embodiments, the material may be transparent to the type of non-visible light that is being used for marking the dental appliance 320.

Laser marking can include directing light from the laser marking source to a target area 324 for laser marking of the appliance 320. The appliance can be transparent to the laser energy from the light allowing the laser energy to mark the appliance at the target area 324. The target area for laser marking can be defined within the body of the appliance between the interior surface 318 and exterior surface 322. The target area 324 for laser marking can be the laser marking location within the appliance where the laser marking appears which can be between the interior and exterior surface including marking on one of the surfaces. While FIG. 3 illustrates a single target area, appliances can include multiple target areas defined within the appliance for multiple laser markings.

The target area 324 within the body of the appliance 320 can contain a quantity of at least one particulate material 326 interspersed within the target area 324. For example, the at least one particulate material 326 can be interspersed within appliance 320 between the interior surface 318 and exterior surface 322 at the target area 324. Particulate material 326 can have laser energy absorption characteristics that are greater than that of the material used to form the body without the particulate material 326 (e.g., the particulate material 326 has laser energy absorption characteristics that are greater than that of the material forming portions of the body outside of the target area 324).

In some embodiments, the quantity of particulate material 326 can be interspersed within the materials forming the entire appliance 320. The appliance 320 is not limited to one type of particulate material 326. For example, more than one particulate material can be interspersed within the appliance 320. In various embodiments, the material of the body can be formed such that the appliance 320 includes a first and a second target area defined between the interior surface 318 and the exterior surface 322. In such an embodiment, a quantity of first particulate material can be interspersed within the first target area and a quantity of second particulate material can be interspersed within the second target area.

Additionally, more than one particulate material can be interspersed within a single target area. For example, a first quantity of a first particulate material and a second quantity of a second particulate material can be interspersed within the target area 324. The first quantity of the first particulate material and the second quantity of the second particulate material can be interspersed within a same portion of the target area 324 or the first quantity of the first particulate material can be interspersed within a portion of the target area 324 and the second quantity of the second particulate material can be interspersed within a portion of the target area 324 that does not contain the first particulate material.

A particular type of particulate material can have a heightened reactivity to a particular range of wavelengths of laser energy, which can allow for a particular particulate material to be interspersed within the material (e.g., a sheet of thermoforming material) used to form the appliance 320 depending on the wavelength of the laser energy that is used for laser marking. For example, a first particulate material can have a heightened reactivity to a first range of wavelengths of laser energy as compared to a second range of wavelength, while a second particulate material can have a heightened reactivity to the second range of wavelengths of laser energy as compared to the first range of wavelengths. In such an embodiment, the first range of wavelengths of laser energy can be different than the second range of wavelengths of laser energy.

In such an embodiment, different ranges of wavelengths can correspond to a different shade of black, or a color. Thus, the particulate material that is interspersed within the appliance 320 and the range of wavelengths of laser energy that is used for marking can depend on a desired shade or color of laser marking.

FIGS. 4A-4H illustrate a number of target areas defined within a dental appliance according to a number of embodiments of the present disclosure.

As previously described, multiple target areas can be defined within an appliance between the interior and exterior surfaces. As illustrated in FIGS. 4A-4H, appliances can include more than one target area and/or particulate materials. The particulate material can have laser energy absorption characteristics that are greater than that of the transparent material forming portion of the body outside of the target areas. Additionally, in an embodiment where there is more than one particulate material, each particular particulate material can have unique characteristics. For instance, each particulate material can have a heightened reactivity to a different particular range of wavelengths of laser energy of a light from a laser marking source. Thus, a first particulate material can have a heightened reactivity to a first range of wavelengths of laser energy of a light from a laser marking source and the second particulate material can have a heightened reactivity to a second range of wavelengths of laser energy of a light from a laser marking source, where the first range of wavelengths of laser energy is different than the second range of wavelengths of laser energy.

Each particulate material can also have a unique average particle size and/or a particle density. For instance, a first particulate material can have a different average particle size and/or particle density than a second particulate material which may cause one particle to react to laser energy differently than another particle having a different characteristic.

Figure 4A:
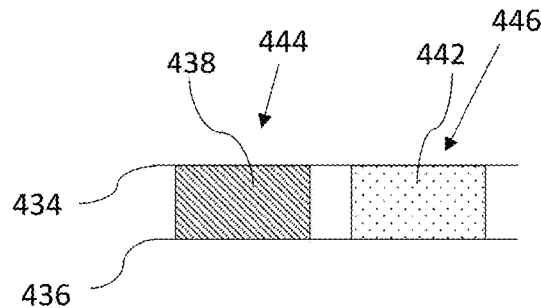
FIGS. 4A-4H illustrate a number of target areas defined within a dental appliance according to a number of embodiments of the present disclosure.

As illustrated in FIG. 4A, appliances can include a first target area 444 and a second target area 446 defined within the body between the interior surface 434 and the exterior surface 436. In such an embodiment, a first quantity of a first particulate material 438 can be interspersed within the first target area 444 and a second quantity of a second particulate material 442 can be interspersed within the second target area 446.

Figure 4B:
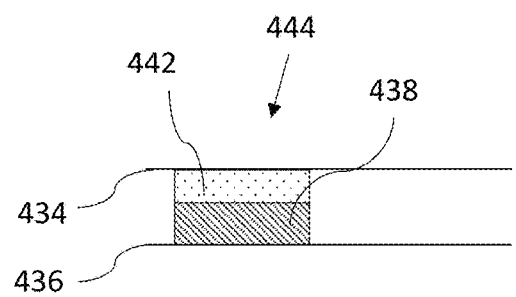

As illustrated in FIG. 4B, appliances can include a first target area 444 defined within the body between the interior surface 434 and the exterior surface 436. In such an embodiment, a quantity of a first particulate material 438 and a quantity of a second particulate material 442 can be interspersed within the first target area 444. The quantity of the first particulate material 438 and the quantity of the second particulate material 442 can be interspersed within the same portion of the first target area 444.

Figure 4C:
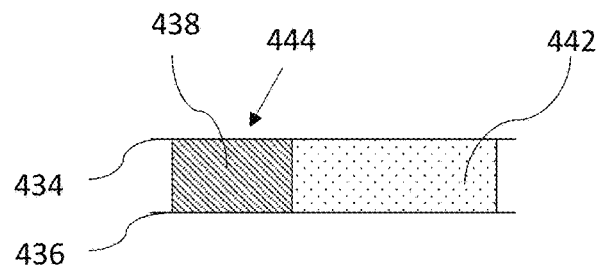

As illustrated in FIG. 4C, appliances can include a first target area 444 defined within the body between the interior surface 434 and the exterior surface 436. In such an embodiment, a quantity of a first particulate material 438 can be interspersed within the first target area 444 and a quantity of a second particulate material 442 can be interspersed within a portion of the material of the body of the appliance that is outside of the first target area 444.

Figure 4D:
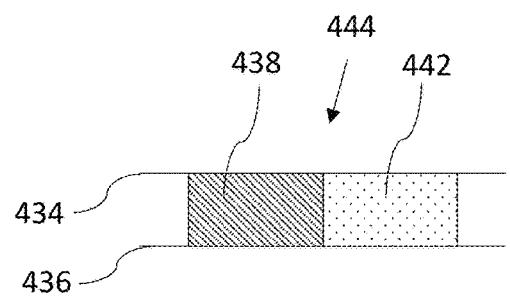

As illustrated in FIG. 4D, appliances can include a first target area 444 defined within the body between the interior surface 434 and the exterior surface 436. In such an embodiment, a quantity of a first particulate material 438 can be interspersed within a first portion of the first target area 444 and a quantity of a second particulate material 442 can be interspersed within second portion of the first target area 444.

In some embodiments, the quantity of the first particulate material 438 and the quantity of the second particulate material 442 can be interspersed within the first target area 444 so that they do not overlap. Thus, the first portion of the first target area 444 is different than the second portion of the first target area 444.

Figure 4E:
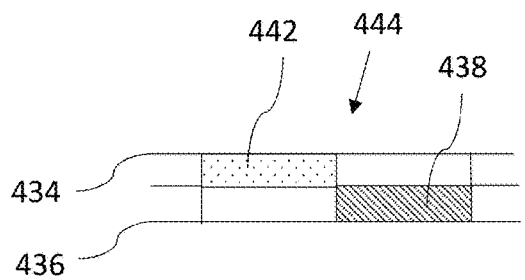

As illustrated in FIG. 4E, appliances can be formed from multiple layers. Additionally, the appliance can include a first target area 444 defined within the body between the interior surface 434 and the exterior surface 436. In such an embodiment, a quantity of a first particulate material 438 can be interspersed within a first portion of the first target area 444 and a quantity of a second particulate material 442 can be interspersed within second portion of the first target area 444. Additionally, the quantity of the first particulate material 438 can be interspersed within a first layer of the appliance and the quantity of the second particulate material 442 can be interspersed within a second layer of the appliance. Thus, the first portion of the first target area 444 is different than the second portion of the first target area 444.

Figure 4F:
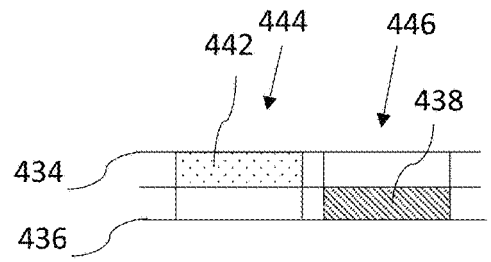

As illustrated in FIG. 4F, appliances formed from multiple layers can include a first target area 444 and a second target area 446 defined within the body between the interior surface 434 and the exterior surface 436. In such an embodiment, a quantity of a first particulate material 438 can be interspersed within the first target area 444 and a quantity of a second particulate material 442 can be interspersed within the second target area 446. Additionally, the quantity of the first particulate material 438 can be interspersed within a first layer of the appliance and the quantity of the second particulate material 442 can be interspersed within a second layer of the appliance.

Figure 4G:
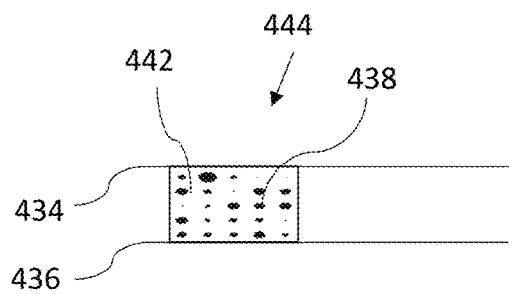

As illustrated in FIG. 4G, appliances can include a first target area 444 defined within the body between the interior surface 434 and the exterior surface 436. In such an embodiment, a quantity of a first particulate material 438 and a quantity of a second particulate material 442 can be interspersed together within the first target area 444. For example, the quantity of the first particulate material 438 and the quantity of the second particulate material 442 can be mixed together and interspersed within the first target area 444, which can allow the first and second particulate materials to be activated by more of less energy or different wavelength ranges, etc.

Figure 4H:
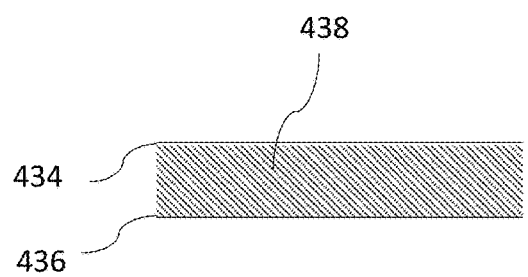

As illustrated in FIG. 4H, appliances can include a quantity of particulate material interspersed within the body between the interior surface 434 and the exterior surface 436. In such an embodiment, the first particulate material 438 can have a heightened reactivity to a first range of wavelengths of laser energy of a light from a laser marking source. Thus, a laser marking source which supplies light with the first range of laser energy can laser mark between the interior surface 434 and the exterior surface 436, which contains the quantity of the first particulate material 438.

Figure 5A:
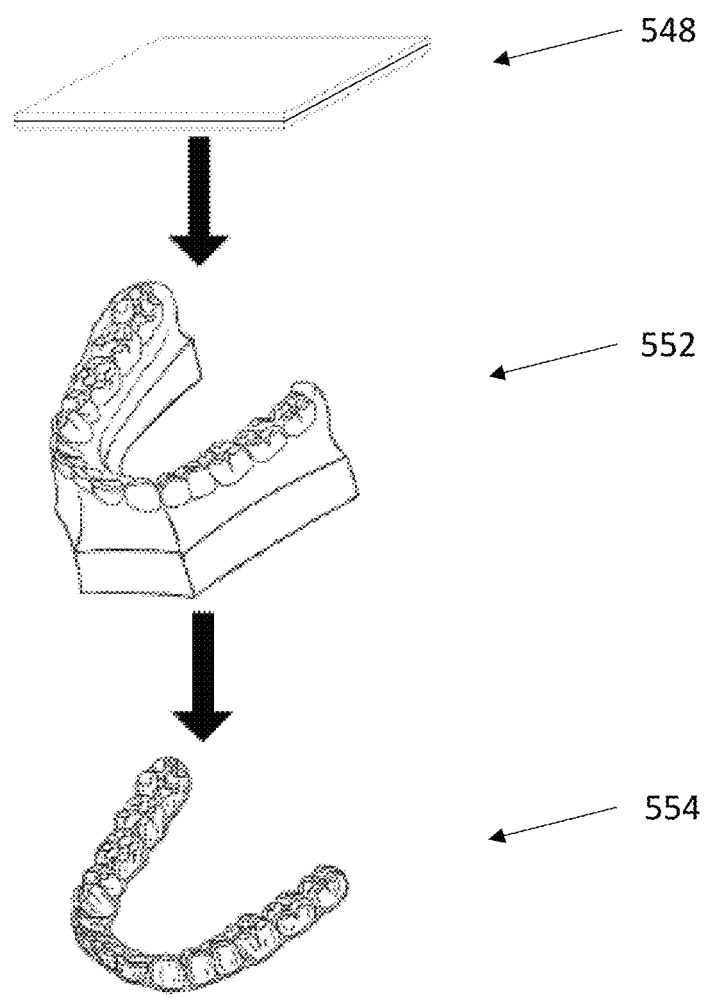
FIGS. 5A and 5B illustrates a method for forming a dental appliance according to a number of embodiments of the present disclosure.
Figure 5B:
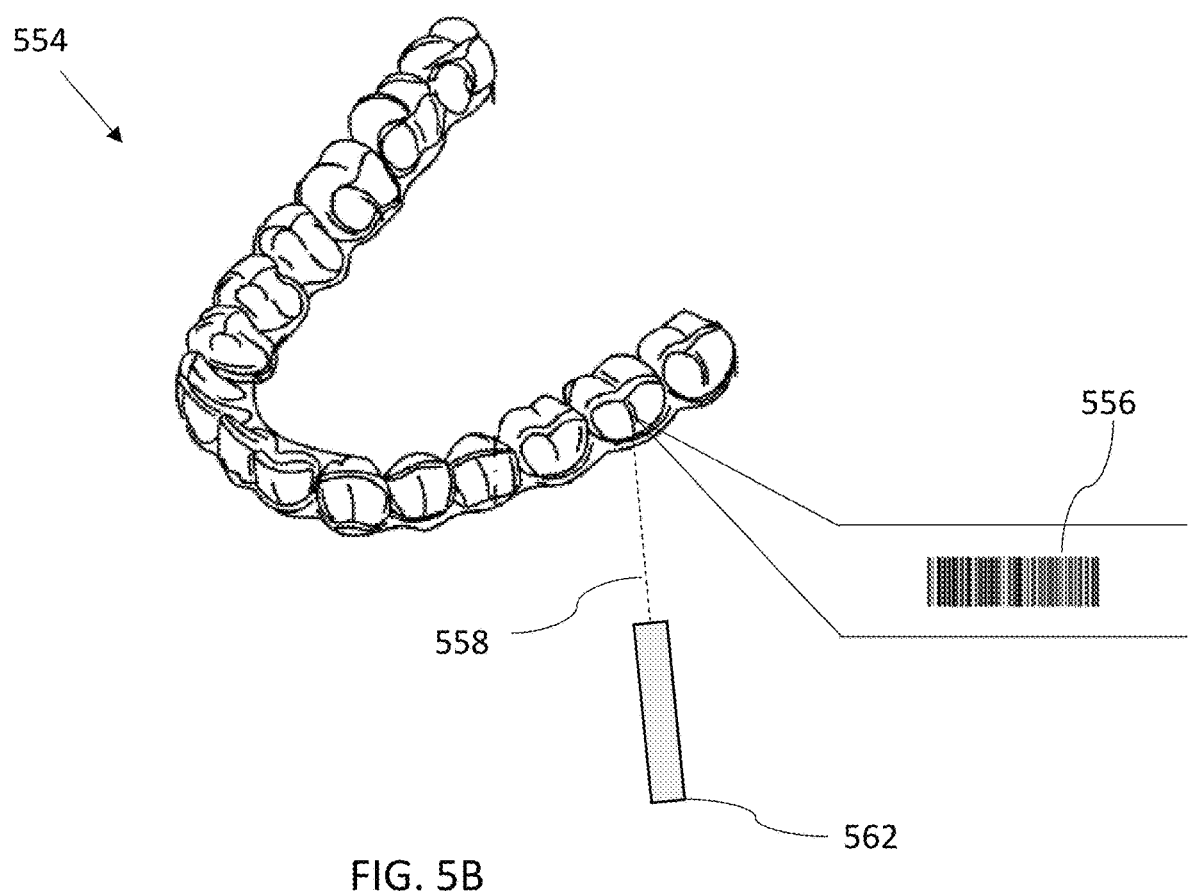

FIGS. 5A and 5B illustrate a process for forming a dental appliance according to a number of embodiments of the present disclosure. As illustrated by FIG. 5A, in some embodiments, forming the appliance 554 can include thermoforming the appliance from a sheet of material 548 placed over a mold 552 of a patient's teeth, for example, based on an arrangement of the teeth determined by a treatment plan. The appliance 554 can be formed from a transparent (e.g., translucent) material for improved laser marking. The sheet of material 548 can also have an interior and exterior surface, where a particulate material is interspersed substantially uniformly throughout the entire sheet of the material 548 between the interior and exterior surface.

In some embodiments, the dental appliance 554 may be formed from a light transmissive material to allow light (e.g., a laser beam) from the light source to mark the transparent material of the dental appliance. However, in some embodiments, the light used to mark the dental appliance may not be visible light and, in such embodiments, the material may be transparent to the type of non-visible light that is being used for marking the dental appliance (e.g., ultraviolet (UV) light).

Thermoforming the appliance from the sheet of material 548 placed over the mold 552 of the patient's teeth can include heating the sheet and then vacuum or pressure forming the sheet over the mold 552 of the patient's teeth. The appliance is then a direct representation of the mold 552 of the patient's teeth. Excess material can be trimmed to form a final appliance 554 that can be used for orthodontic treatment of the patient. Alternatively, in some embodiments, the appliance can be formed by three dimensional printing rather than from a sheet of material.

As illustrated in FIG. 5B, the appliance 554 can be formed from a transparent material for improved laser marking. As previously described, the appliance 554 can include an exterior surface at a laser access area that has a textured (e.g., rougher) surface than at least a portion of the interior surface. The surface texture of a laser access area may interact with laser energy from light 558 from a laser marking source 562 to disperse the laser energy at the target area for laser marking defined within the appliance 554.

Additionally, the target area can contain a quantity of particulate material interspersed within the target area. The particulate material may have laser radiation absorption characteristics that are greater than that of the transparent material that is used to form the appliance 554 (e.g., the material used to form the sheet that is not the particulate material) allowing the laser energy from the light to be fully absorbed by the particulate material. The laser radiation absorption characteristics may allow for marking contrast, line edged detail, and increased marking speed on plastic materials that have been traditionally difficult to achieve resulting in increased laser mark reading and creation efficiency.

Thus, the laser marking source 562 can direct light 558 at the laser access area and the rougher surface texture of the laser access area can be configured to disperse the laser energy from the light 558 for laser marking as the laser energy interacts with the rougher surface texture. In this manner, the particulate material interspersed within the target area can absorb the laser energy to create a laser marking 556. The laser marking 556 can include an object imprinted into the material of the appliance, such as appliance and/or patient identification information. Disbursing the laser energy can promote heating of the material imprinting (e.g., marking) the object into the appliance 554. The laser marking 556 (e.g., the imprinted object) can be colored or in black.

Figure 6:
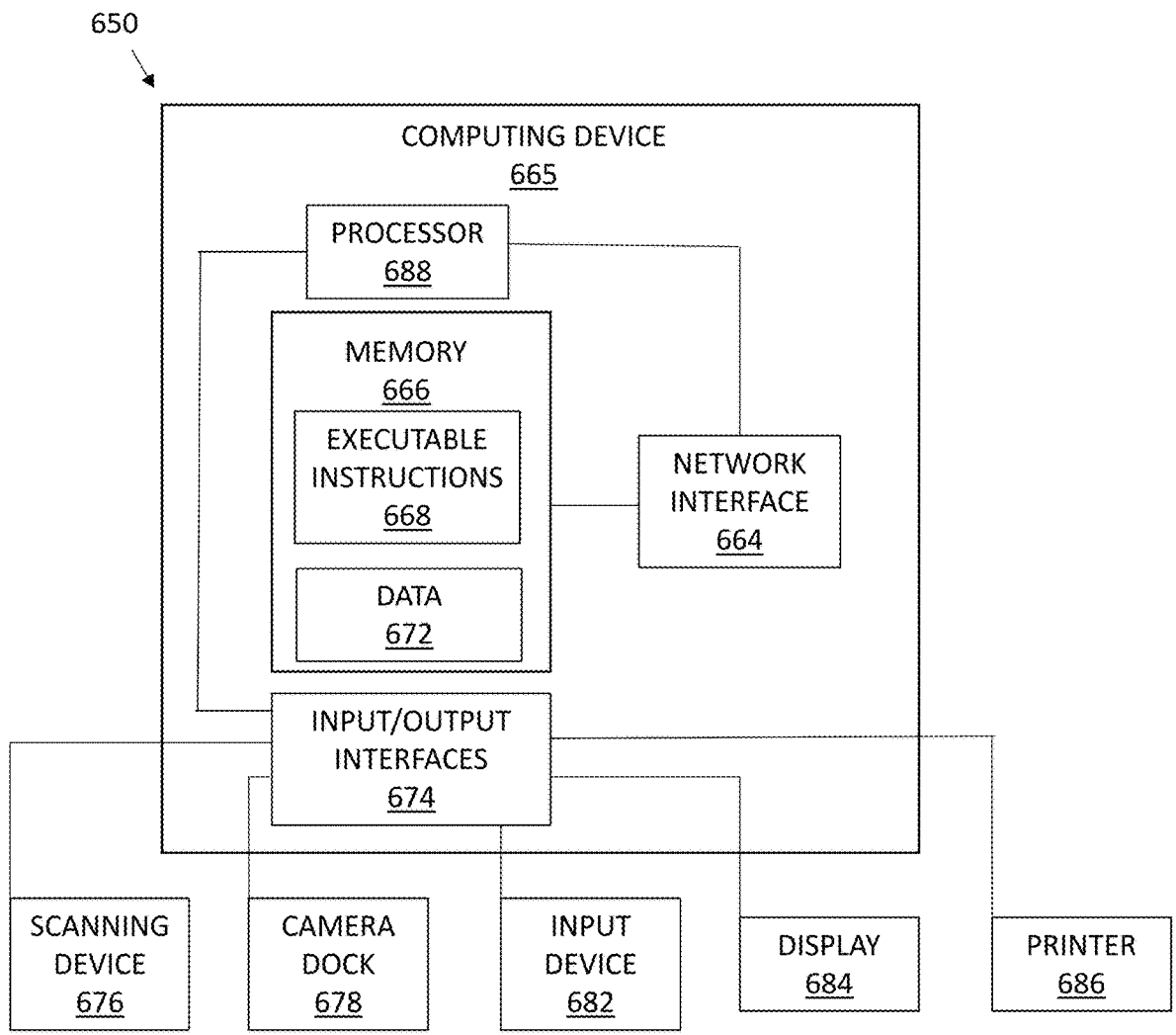
FIG. 6 illustrates a computing system for use in a number of embodiments of the present disclosure.

FIG. 6 illustrates a computing system 650 for use in a number of embodiments of the present disclosure. FIG. 6 illustrates a computing system 650 for use in a number of embodiments of the present disclosure. For instance, a computing device 665 can have a number of components coupled thereto. The computing device 665 can include a processor 688 and a memory 666. The memory 666 can have various types of information including data 672 and executable instructions 668, as discussed herein.

The processor 688 can execute instructions 668 that are stored on an internal or external non-transitory computer device readable medium (CRM). A non-transitory CRM, as used herein, can include volatile and/or non-volatile memory.

Volatile memory can include memory that depends upon power to store information, such as various types of dynamic random access memory (DRAM), among others. Non-volatile memory can include memory that does not depend upon power to store information.

Memory 666 and/or the processor 688 may be located on the computing device 665 or off of the computing device 665, in some embodiments. As such, as illustrated in the embodiment of FIG. 6, the computing device 665 can include a network interface 664. Such an interface 664 can allow for processing on another networked computing device, can be used to obtain information about the patient (e.g., characteristics of the patient's mouth and/or treatment planning information) and/or can be used to obtain data and/or executable instructions for use with various embodiments provided herein.

In some embodiments, a computing device can be used to design the sheet with interspersed particulate (e.g., selecting the type of particulate, where the particulate is to be positioned within the sheet, design of a layered sheet, etc.) or select materials for three dimensional printing. Computing devices can also be used to design patterns to be used to rough a surface of an appliance and/or tools to accomplish such roughing.

As illustrated in the embodiment of FIG. 6, the computing device 665 can include one or more input and/or output interfaces 674. Such interfaces 674 can be used to connect the computing device 665 with one or more input and/or output devices 676, 678, 682, 684, 686.

For example, in the embodiment illustrated in FIG. 6, the input and/or output devices can include a scanning device 676, a camera dock 678, an input device 682 (e.g., a mouse, a keyboard, etc.), a display device 684 (e.g., a monitor), a printer 686, and/or one or more other input devices. The input/output interfaces 674 can receive executable instructions and/or data, storable in the data storage device (e.g., memory 666), representing a virtual dental model of a patient's dentition.

In some embodiments, the scanning device 676 can be configured to scan one or more physical dental molds of a patient's dentition. In one or more embodiments, the scanning device 676 can be configured to scan the patient's dentition, a dental appliance, and/or an attachment directly. The scanning device 676 can be configured to input data into the computing device 665 which can then be used for treatment planning and/or generating digital 3D models of the patient's dentition. This information can also be used to estimate the forces discussed herein.

In some embodiments, the camera dock 678 can receive an input from an imaging device (e.g., a 2D or 3D imaging device) such as a digital camera, a printed photograph scanner, and/or other suitable imaging device. The input from the imaging device can, for example, be stored in memory 666.

The processor 688 can execute instructions to provide a visual indication of a treatment plan, a dental appliance, one or more target areas, and/or one or more laser access areas on the display 684. The computing device 665 can be configured to allow a treatment professional or other user to input treatment goals. Input received can be sent to the processor 688 as data 672 and/or can be stored in memory 666.

The data 672 may include a 3D model of an object to be 3D printed by the printer 686. The 3D model may comprise a mathematical representation of one or more surfaces of the object. The 3D model may have been rendered through automated agents or by an operator through, e.g., the techniques discussed further herein. The 3D model may be stored as a digital model file of a 3D virtual representation of a 3D object to be printed. The digital model file may be formatted according to a variety of formats, such as an Additive Manufacturing File (AMF) (e.g., one that uses sequential layers), an STL file, a fused deposit modeling (FDM) file, etc.

Such connectivity can allow for the input and/or output of data and/or instructions among other types of information. Some embodiments may be distributed among various computing devices within one or more networks, and such systems as illustrated in FIG. 6 can be beneficial in allowing for the capture, calculation, and/or analysis of information discussed herein.

The processor 688, can be in communication with the data storage device (e.g., memory 666), which has the data 672 stored therein. The processor 688, in association with the memory 666, can store and/or utilize data 672 and/or execute instructions 668 for forming an appliance for improved laser marking.

The processor 688, in association with the memory 666 can, in addition to or alternatively, store and/or utilize data 672 and/or execute instructions 668 for creating a dental appliance for improved laser marking, as well as a virtual modeling of such an item. The processor 688 coupled to the memory 666 can, for example, include instructions to cause the computing device 665 to perform a method including, for example, forming a virtual dental appliance body indicated as being formed from at least one material, at least a portion of the body indicated as being transparent to laser energy, and defining in the virtual body, a virtual target area for laser marking between an interior surface and an exterior surface of the appliance body and including interspersing a virtual first particulate material within the target area, where the first particulate material indicated as having a heightened reactivity to a first range of wavelengths of laser energy as compared to a second range of wavelengths.

In various embodiments, the processor 688 coupled to the memory 666 can cause the computing device 665 to perform the method comprising forming a virtual dental appliance body indicated as being formed from at least one material, at least a portion of the body indicated as being transparent to laser energy, and defining in the virtual body, a virtual target area for laser marking between an interior surface and an exterior surface of the appliance body, defining a virtual laser access area on at least one of the virtual interior or exterior surfaces, and defining a roughed portion on at least a portion of the virtual laser access area such that the roughed portion has a rougher surface texture than at least one of, a portion of the virtual exterior surface that is not within the laser access area or a portion of the virtual interior surface.

Such analysis can be accomplished one or more times for a treatment plan. For example, if a treatment plan has 30 stages, it would be possible to have different dental appliance configurations for each stage or possibly more, if desired. However, in many instances the dental appliance shape, position, and/or orientation may be changed a few times during the treatment plan.

The executable instructions 668 may comprise instructions to transform a 3D model of an object into printable portions that can be printed by the printer 686. In some implementations, the executable instructions 668 may comprise instructions to "slice" a 3D model, e.g., to convert the 3D model into a set of thin layers that are to be 3D printed by the printer 686. In some implementations, the executable instructions 668 convert a 3D model into a sliced format file (e.g., a G-code file) that can be provided to the printer 686.

In some implementations, the display 684 may be configured to display a 2D rendering of a 3D model of an object to be 3D printed. The 2D rendering may have been developed through simulations, projections, mappings, etc. of the 3D model into a 2D space. The display 684 may further be configured to display user interface elements to allow an operator to interact with a 3D model.

In some embodiments, the printer 686 can be a three-dimensional or direct fabrication device that can create a dental appliance directly from instructions from the computing device 665. Embodiments of the present disclosure utilizing such technology can be particularly beneficial for a variety of reasons. For example, such direct manufacture allows for less waste of materials due to less processing steps.

The printer 686 may be configured to use additive manufacturing techniques to print 3D objects using virtual representations of those 3D objects. In some implementations, the printer 686 join and/or solidify material (e.g., polymeric material) based on instructions from the processor 688 to create a 3D object. As noted herein, the printer 686 may receive from the memory 666 a sliced format file. The printer 686 may successively add material to a 3D object on a layer-by-layer basis using, e.g., SLA, FDM, etc.

The printer 686 may print a 3D object at a specified resolution. The resolution of the printer 686 may describe layer thickness(es) and/or X-Y resolutions in a convenient format, such as dots per inch (dpi) or micrometers (µm).

Figure 7:
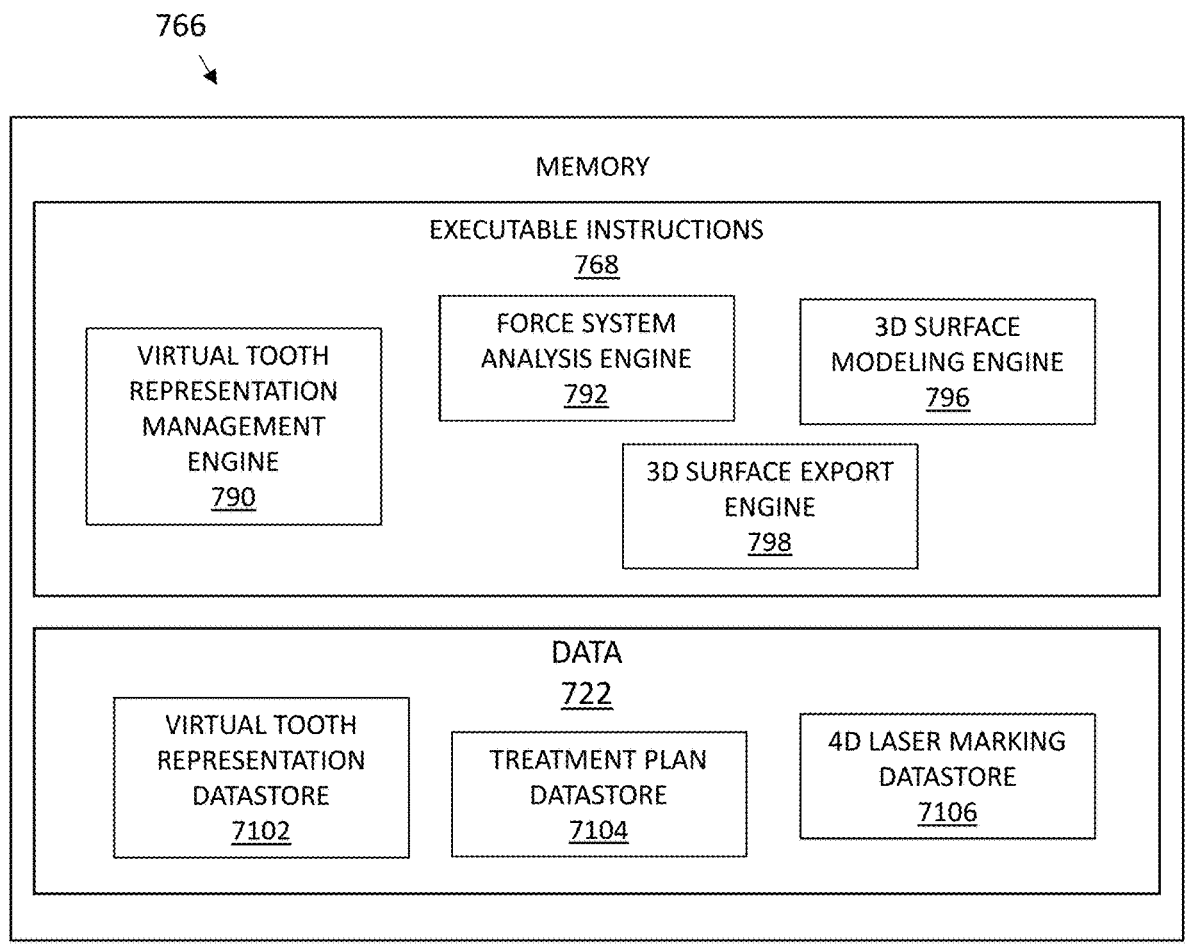
FIG. 7 illustrates a computing system for use in a number of embodiments of the present disclosure.

FIG. 7 illustrates a memory 766 for use in a number of embodiments of the present disclosure. Memory 766 may be, for example, memory 666 previously described in connection with FIG. 6.

The memory 766 may have various types of information including executable instructions 768 and data 772, as discussed herein. Additionally, the memory 766 may include one or more engines and datastores. A computer system can be implemented as an engine, as part of an engine or through multiple engines. As used herein, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like.

As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used herein, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud based datastore is a datastore that is compatible with cloud-based computing systems and engines.

The virtual tooth representation management engine 790 may include one or more automated agents configured to gather virtual representations of teeth of a patient from the virtual tooth representation datastore 7102. The virtual tooth representation management engine 790 may provide an identifier of a patient and retrieve from the virtual tooth representation datastore 7102 virtual representations of teeth of the patient.

In various implementations, the virtual tooth representation management engine 790 renders a 3D virtual representation of teeth for display on a computer display. As an example, the virtual tooth representation management engine 790 may load 3D graphics corresponding to various perspectives (sagittal, median, frontal/coronal, transverse/axial etc. perspectives) of a patient's teeth.

The optional force system analysis engine 792 may include one or more automated agents configured to gather an orthodontic treatment plan from the optional treatment plan datastore 7104. In some implementations, the optional force system analysis engine 792 is configured to gather from an orthodontic treatment plan a set of positional force systems to apply to a patient's teeth.

The positional force systems may include linear forces, torques, anchor forces, etc. that are to be applied to the patient's teeth over the course of the orthodontic treatment plan. The positional force systems may be implemented by aligners, attachments, or some combination thereof.

The 3D surface export engine 796 may include one or more automated agents configured to export a 3D surface model. The 3D surface export engine 796 may save a 3D surface model in a relevant format, configure a 3D surface model for streaming, and/or format a 3D surface model for 3D printing, for instance.

The virtual tooth representation datastore 7102 may be configured to store virtual representations of teeth. The virtual tooth representation datastore 7102 may index the virtual representations of teeth by patient and/or by stage of a treatment plan. As noted further herein, the virtual representations of teeth may comprise position(s), orientation(s), etc. of teeth of a patient that is relevant to application of orthodontic aligners to the patient. In some implementations, the virtual representations of teeth are estimates/approximations of a patient's teeth at a beginning, end, or intermediate stage of an orthodontic treatment plan. In some implementations, virtual representations of teeth are stored as virtual objects that can be accessed by the engines described herein.

The optional treatment plan datastore 7104 may be configured to store treatment plan data. The treatment plan data may include instructions to apply aligners and/or attachments to teeth to generate various orthodontic outcomes. The treatment plan data may, for instance, include instructions to apply force positioning systems to teeth at different times in order to achieve translations, rotations, anchors, etc. to those teeth.

The virtual laser marking datastore 7106 may be configured to store virtual representations of laser markings. The virtual representations of laser markings may include size parameters, shape parameters, and/or orientation parameters, as well as roughing or particulate parameters related to how the marking is to be accomplished. In some implementations, virtual representations of laser markings are stored as virtual objects that can be accessed by the engines described herein.

Figure 8:
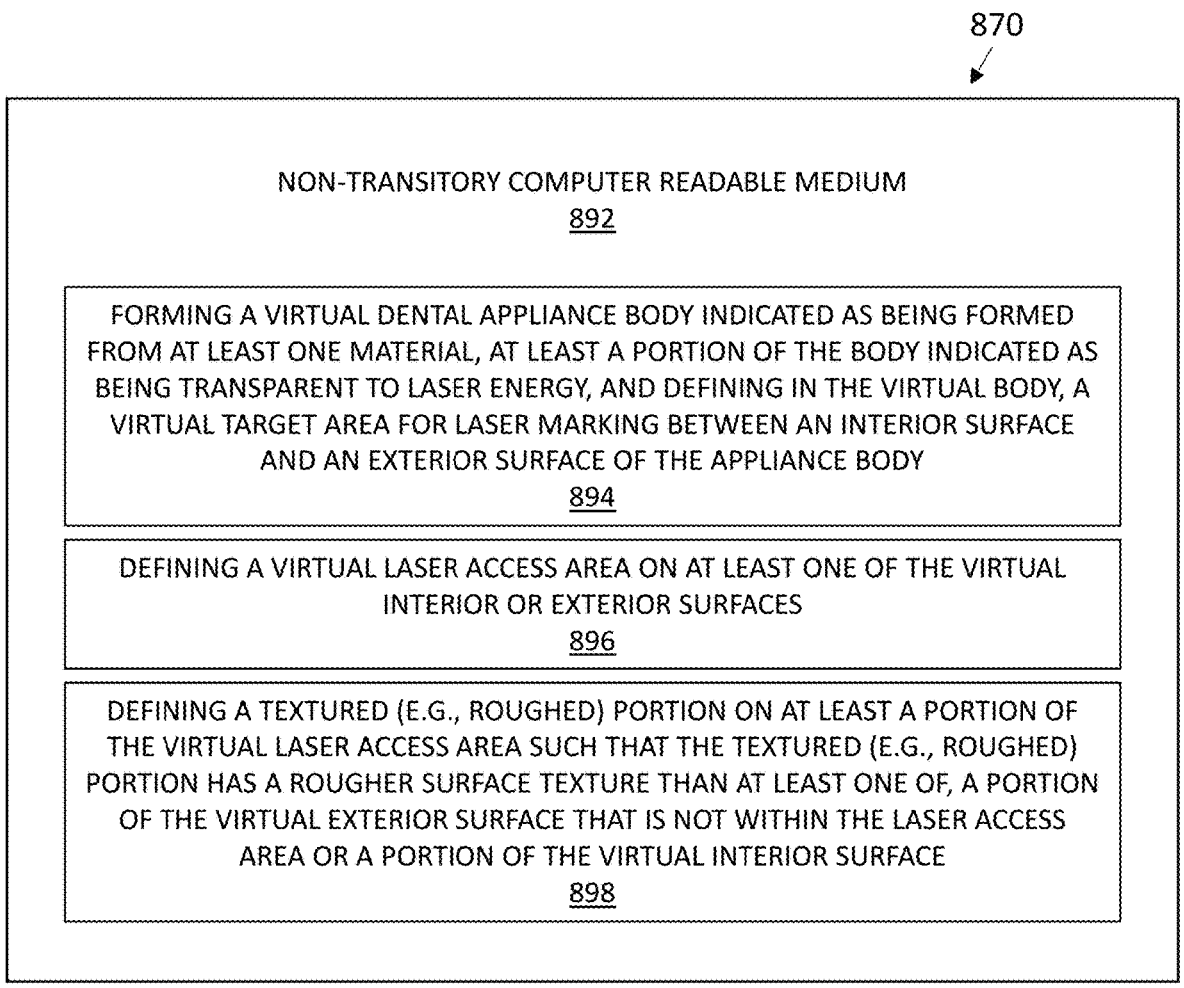
FIG. 8 illustrates a non-transitory computer readable medium having instructions for forming a dental appliance according to a number of embodiments of the present disclosure.

FIG. 8 illustrates a non-transitory computer readable medium 870 having instructions for forming a dental appliance according to a number of embodiments of the present disclosure.

Instructions 894 can include forming a virtual dental appliance body indicated as being formed from at least one material, at least one portion of the body indicated as being transparent to laser energy, and defining in the virtual body, a virtual target area for laser marking between an interior surface and an exterior surface of the appliance body.

Instructions 896 can include defining a virtual laser access area on at least one of the virtual interior or exterior surfaces. The virtual laser access area can be configured to disperse light energy from light from a laser marking source at the virtual target area within the appliance.

Instructions 898 can include defining a roughed portion on at least a portion of the virtual laser access area such that the roughed portion has a rougher surface texture than at least one of, a portion of the virtual exterior surface that is not within the laser access area or a portion of the virtual interior surface. The rougher surface texture can be provided by a non-random pattern of surface features formed in the virtual exterior surface or interior surface.

The non-random pattern of surface features can be configured to disperse laser energy at the target area in a manner based on the laser energy's interaction with the non-random pattern. In another embodiment, the rougher surface area can be provided by a random pattern of surface features formed in the exterior surface or the interior surface. The random pattern of surface features can be configured to disperse laser energy at the target area in a manner based on the laser energy's interaction with the random pattern.

Surface features formed in the virtual exterior or interior surfaces of the virtual appliance can include height variations, translucency variations, and density variations, among other surface features. The surface features can be configured to promote heating in one or more particular areas of the virtual target area when the laser energy is applied to the virtual appliance by the laser marking source.

Instructions can further include creating a physical dental appliance based on the virtual dental appliance body having the physical laser access area with a roughed portion and target area. The virtual model can be provided to a fabrication device for fabrication of a physical model corresponding to the jaw for formation of the appliance. The virtual model can be provided (e.g., via network interface) to a fabrication device for fabrication of physical models corresponding to the jaw at the first and the second stages of the treatment plan for formation of appliances thereover such that the appliance having the physical laser access area with a roughed portion and target area.

FIG. 9 illustrates a non-transitory computer readable medium 980 having instructions for forming a dental appliance according to a number of embodiments of the present disclosure.

Instructions 9104 can include forming a virtual dental appliance body indicated as being formed from at least one material, at least a portion of the body transparent to laser energy. In the virtual body, a virtual target area for laser marking can be defined between an interior surface and an exterior surface of the appliance body. Additionally, a virtual first particulate material can be interspersed within the target area, where the virtual first particulate material can be indicated to have a heightened reactivity to a first range of wavelengths of laser energy compared to a second range of wavelengths.

Further, instructions can include forming a physical dental appliance body from the indicated at least one material, where at least a portion of the body is transparent to laser energy (e.g., at least translucent to the laser energy used for marking). Additionally, defining in the body, a target area for laser marking between an interior and an exterior surface of the appliance body. The target area can include a first particulate material interspersed within the target area, where the first particulate material has a heightened reactivity to a first range of wavelengths of laser energy as compared to a second range of wavelengths.

Figure 10A:
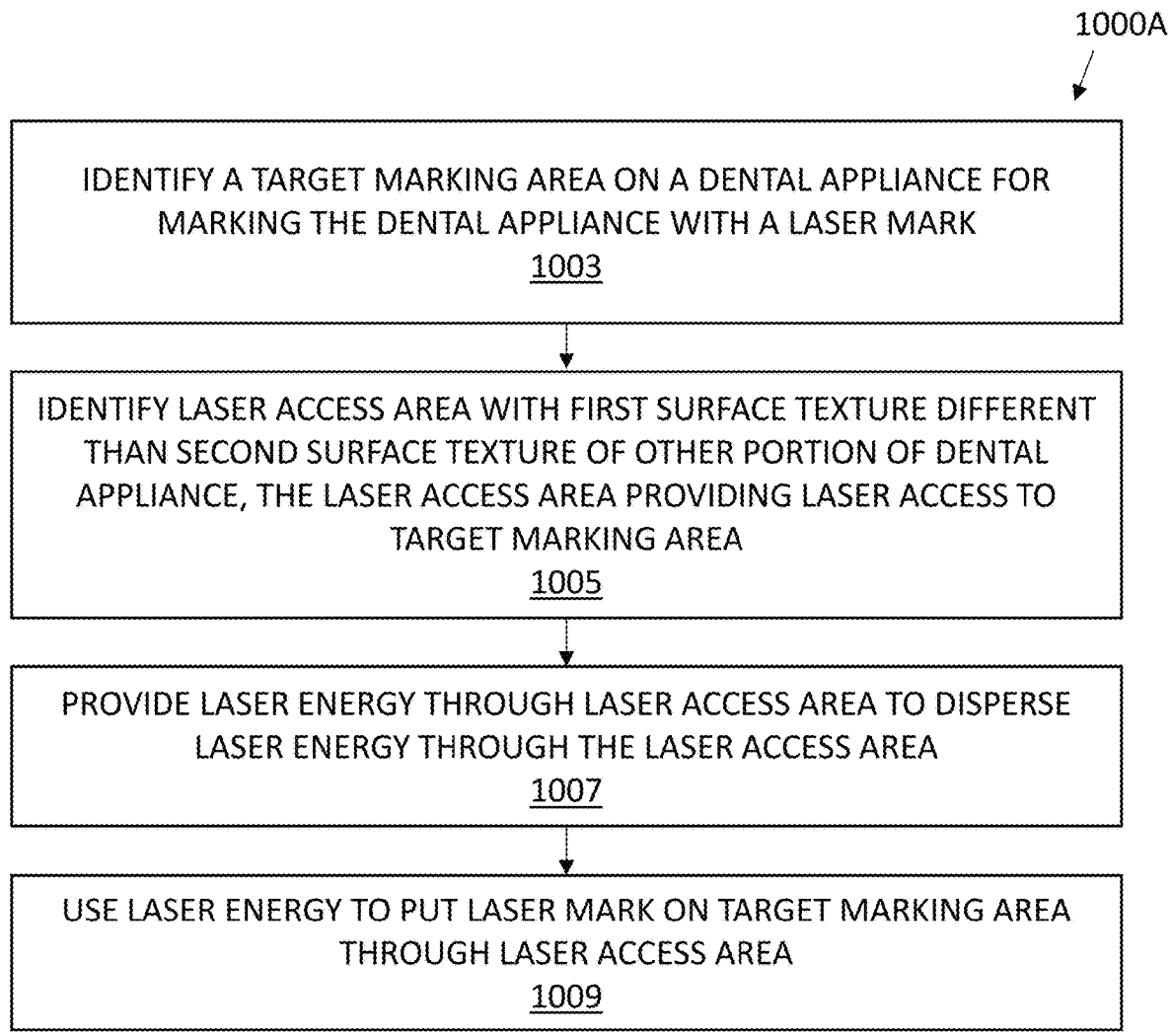
FIG. 10A illustrates a method for providing a laser mark through a laser access area of a dental appliance, according to some implementations.

FIG. 10A illustrates a flowchart of a method 1000A for providing a laser mark through a laser access area of a dental appliance, according to some implementations. The method 1000A may include more or less operations than those explicitly shown in FIG. 10A. Some or all of the operations of the method 1000A may be executed by the computing system 650 and/or other structures shown in FIG. 6. The method 1000A may be used to mark the dental appliance 100 shown in FIG. 1 with a laser mark through the laser access area 106.

At an operation 1003, a target marking area on a dental appliance for marking the dental appliance with a laser mark may be identified. At an operation 1005, laser access area with first surface texture different than second surface texture of other portion of the dental appliance may be identified. The laser access area may provide laser access to the target marking area. At an operation 1007, laser energy may be provided through the laser access area to disperse the laser energy through the laser access area. At an operation 1009, the laser energy may be used to put a laser mark on the target marking area through the laser access area.

Figure 10B:
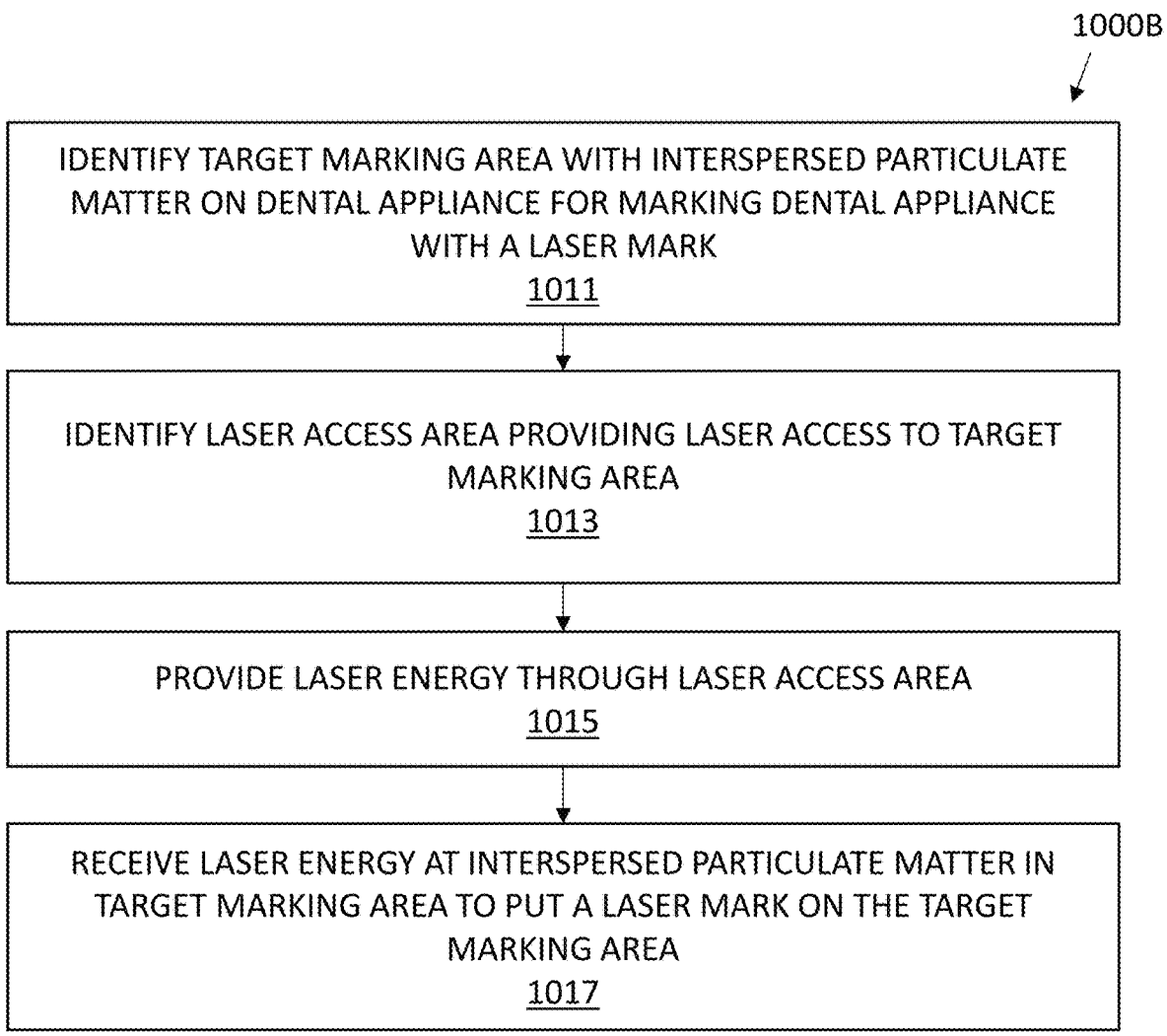
FIG. 10B illustrates a method for providing a laser mark to a target marking area of a dental appliance, according to some implementations.

FIG. 10B illustrates a flowchart of a method 1000B for providing a laser mark to a target marking area of a dental appliance, according to some implementations. The method 1000B may include more or less operations than those explicitly shown in FIG. 10B. Some or all of the operations of the method 1000B may be executed by the computing system 650 and/or other structures shown in FIG. 6. The method 1000B may be used to mark the dental appliance 100 shown in FIG. 1 with a laser mark at the target marking area 108.

At an operation 1011, a target marking area with interspersed particulate matter on a dental appliance for marking the dental appliance with a laser mark may be identified. At an operation 1013, laser access area of the dental appliance aligner may be identified. The laser access area may provide laser access to the target marking area. At an operation 1015, laser energy may be provided through the laser access area. At an operation 1017, the laser energy may be received at the interspersed particulate matter to put a laser mark on the target marking area through the laser access area.

Figure 11:
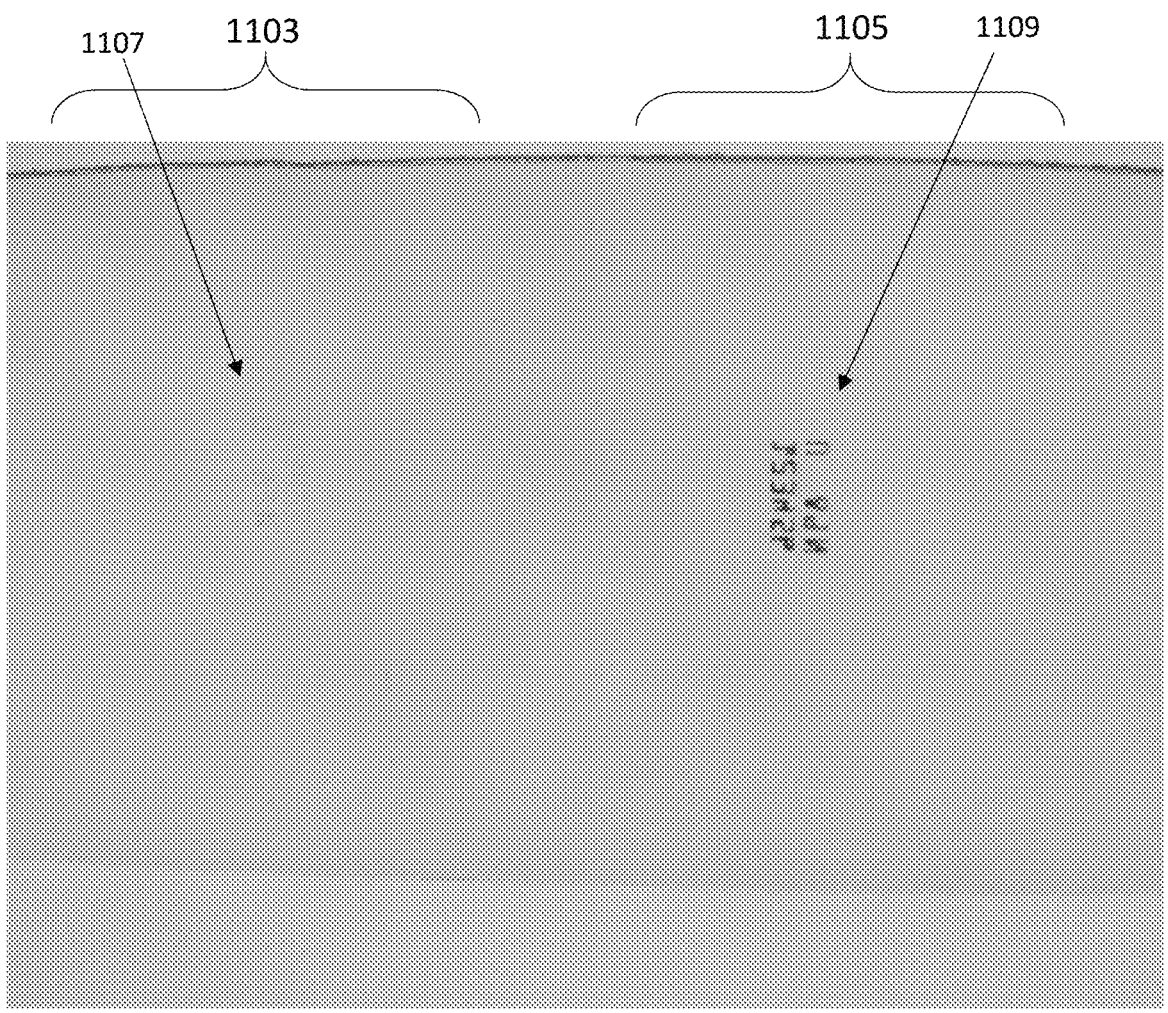
FIG. 11 illustrates one example of laser marking on a substrate (e.g., Tridan 30) having different surface textures (first textured side on left, and second textured side on right).
Figure 12:
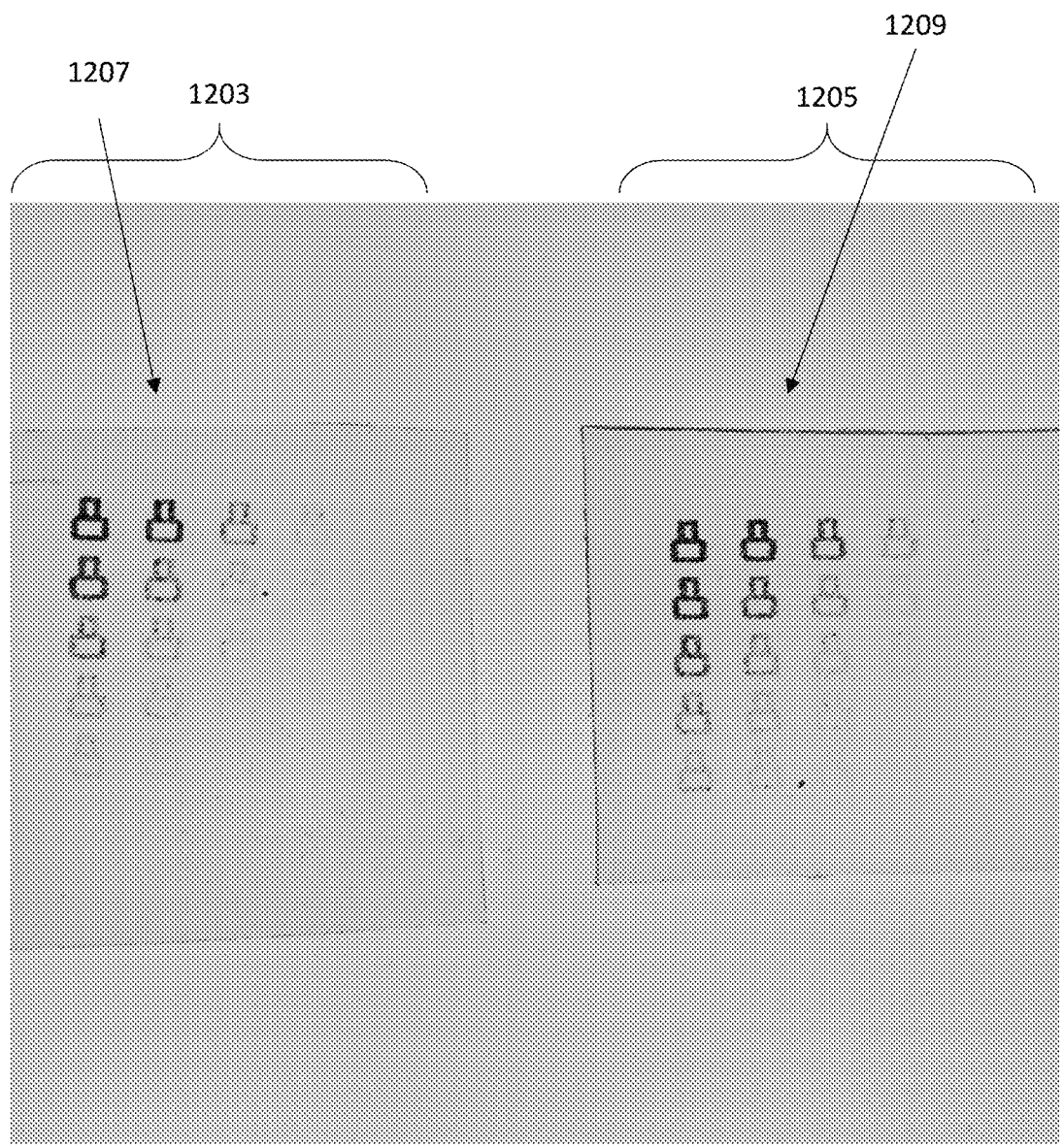
FIG. 12 illustrates one example of laser marking on a substrate (e.g., ST 30) having different surface textures (first textured side on left, and second textured side on right).
Figure 13:
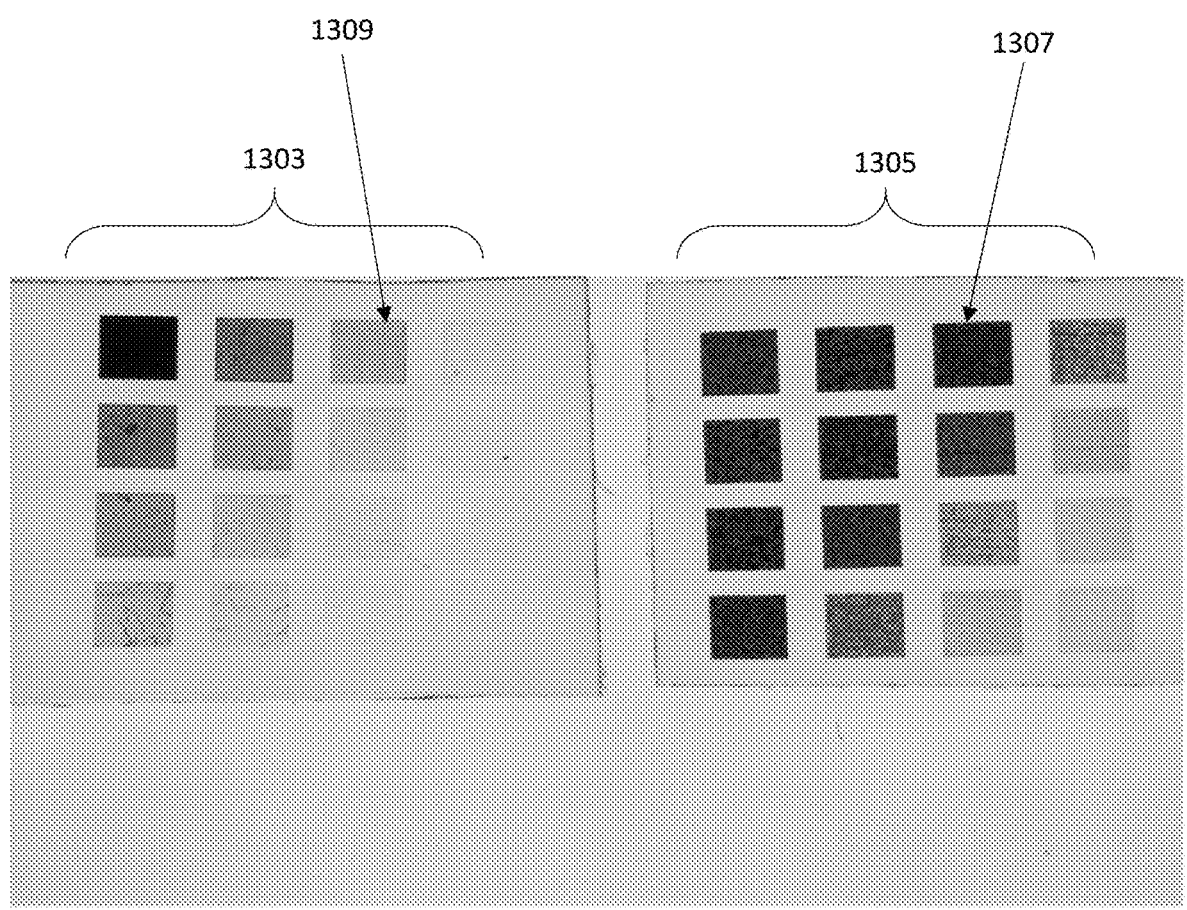
FIG. 13 illustrates one example of laser marking on a substrate (e.g., EX 30) having different surface textures (first textured side on left, and second textured side on right).

The dental appliances described herein may include one or more polymer materials, including one or more polyester, copolyester, polycarbonate, copolycarbonate, and polyurethane materials. FIGS. 11-13 illustrate test results comparing laser markings on substrates made of various polymer materials and having different surface textures. In each of the tests, a ROFIN E25 Air laser (e.g., Coherent, Inc., Santa Clara, California) was used to make the laser markings. As shown in each of the examples of FIGS. 11-13, the laser markings on the textured (e.g., matte or roughened) surfaces are darker than the laser markings on the un-textured or less-textured (e.g., glossy or smoother) surfaces. These examples illustrate how surface textures having a greater roughness can influence the laser marking process and result in higher contrast markings that are easier to detect optically compared to surfaces having lower roughness.

FIG. 11 illustrates a comparison of laser markings made on un-textured 1103 (e.g., glossy) and textured 1105 (e.g., matte) surfaces of a test substrate made of Tritan™ 30 (Eastman Chemical Company). A laser speed of 700 mm/s, laser power of 30 A, and frequency of 19 KHz were used. The textured (matte) surface portion of the substrate was measured to have a surface roughness Ra of 12.97 micrometers per inch and Rz of 102.96 micrometers per inch. The glossy surface portion of the substrate was measured to have a surface roughness Ra of 0.51 micrometers per inch and Rz of 12.23 micrometers per inch. As shown the laser marking on the textured surface 1109 was more visible than the laser mark on the un-textured surface 1107, when the same laser power was used in the same material.

FIG. 12 illustrates a comparison of laser markings made on un-textured 1203 (e.g., glossy) and textured 1205 (e.g., matte) surfaces of a test substrate made of ST 30 material. A laser speeds of 500 mm/s, 600 mm/s, 700 mm/s, 800 mm/s, and 900 mm/s; laser powers of 30 A, 32 A, 34 A, and 36 A; and frequency of 19 KHz were used. The matte surface portion of the substrate was measured to have a surface roughness Ra of 9.96 micrometers per inch and Rz of 52.55 micrometers per inch. The glossy surface portion of the substrate was measured to have a surface roughness Ra of 0.65 micrometers per inch and Rz of 4.95 micrometers per inch. The texture surface portion 1305 resulted in substantially darker markings as compared to markings 1307 on the un-textured surface using the same laser settings.

FIG. 13 illustrates a comparison of laser markings made on un-textured 1303 (e.g., glossy) and textured 1305 (e.g., matte) surfaces of a test substrate made of EX 40 material. A laser speeds of 500 mm/s, 600 mm/s, 700 mm/s, and 800 mm/s; laser powers of 30 A, 32 A, 34 A, and 36 A; and frequency of 19 KHz were used. The textured surface portion of the substrate was measured to have a surface roughness Ra of 29.97 micrometers per inch and Rz of 182.74 micrometers per inch and resulted in significantly darker markings 1307 as compared to the un-textured markings 1309 made with the same laser settings. The un-textured (e.g., glossy) surface portion of the substrate was measured to have a surface roughness Ra of 1.10 micrometers per inch and Rz of 22.04 micrometers per inch.

Reference herein is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process and/or structural changes may be made without departing from the scope of the present disclosure. As used herein, "a number of" a particular thing can refer to one or more of such things (e.g., a number of bite adjustment structures can refer to one or more bite adjustment structures).

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 606 in FIG. 6.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

The embodiments of the present disclosure provide mechanisms for improving marking readability, allowing for expanded marking capabilities, and more efficient marking processes. Although discussed herein with respect to marking of dental appliances, such techniques could be beneficial in many industries where laser marking is utilized.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the Figures. It will be understood that the spatially relative terms are intended to encompass different orientations of the device in use or operation in addition to the orientation depicted in the Figures. For example, if a device in the FIGS. is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A dental appliance, comprising:
    an appliance body, at least a portion thereof formed from a polymer material that is transparent to laser light used to mark the appliance body;
    a target area for laser marking on the appliance body between an interior surface and an exterior surface of the appliance body;
    a laser access area on the exterior surface of the appliance body, wherein the exterior surface at the laser access area has a rougher surface texture that is rougher than a region of the exterior surface outside of the laser access area, wherein the rougher surface texture of the laser access area is configured to allow laser light from a laser beam to pass therethrough to access the target area between the interior surface and the exterior surface of the appliance body; and a particulate material arranged within the target area to absorb the laser light passed through the laser access area to form a laser mark in the target area, the particulate material having a laser light absorption characteristic that is greater than that of the polymer material forming the appliance body without the particulate material, wherein the rougher surface texture of the laser access area reduces an amount of laser light exiting the target area;

wherein the target area comprises the laser mark between the interior surface and the exterior surface of the appliance body.

2. The dental appliance of claim 1, wherein the particulate material is not present within a region of the appliance body adjacent to the target area.

3. The dental appliance of claim 1, wherein the particulate material comprises a pigment or dye.

4. The dental appliance of claim 1, wherein the rougher surface texture is provided by a uniform pattern of surface features formed in the exterior surface.

5. The dental appliance of claim 4, wherein the uniform pattern is configured to disperse laser energy at the target area in a manner based on the laser energy's interaction with the uniform pattern.

6. The dental appliance of claim 1, wherein the rougher surface texture is configured to selectively heat one or more areas within the target area when laser light is applied to the appliance body.

7. The dental appliance of claim 1, wherein the laser access area resides on a buccal side of the dental appliance.

8. The dental appliance of claim 1, wherein the laser access area is on one or more of a molar and a premolar region of the dental appliance, wherein the molar region is configured to be adjacent to a subject's molar when the dental appliance is worn by the subject and the premolar region is configured to be adjacent to the subject's premolar when the dental appliance is worn by the subject.

9. The dental appliance of claim 1, wherein the laser mark comprises one or more of a numerical sequence, an alphanumeric character string, and a design.

10. The dental appliance of claim 1, wherein the laser mark comprises information to track the dental appliance during manufacturing of the dental appliance.

11. The dental appliance of claim 1, wherein the dental appliance comprises an aligner configured to incrementally reposition a patient's teeth from a first position toward a second position.

12. The dental appliance of claim 1, wherein the laser mark is darker than the rougher surface texture.

13. A dental appliance, comprising:
an appliance body, at least a portion thereof formed from a polymer material that is transparent to laser light used to mark the appliance body;
a target area for laser marking on the appliance body between an interior surface and an exterior surface of the appliance body;
a laser access area on the exterior surface of the appliance body, wherein the exterior surface at the laser access area has a rougher surface texture that is rougher than a region of the exterior surface outside of the laser access area, wherein the rougher surface texture of the laser access area is configured to allow laser light from a laser beam to pass therethrough to access the target area between the interior surface and the exterior surface of the appliance body; and
a particulate material arranged within the target area to absorb the laser light passed through the laser access area to form a laser mark in the target area, the particulate material having a laser light absorption characteristic that is greater than that of the polymer material forming the appliance body without the particulate material, wherein the rougher surface texture of the laser access area reduces an amount of laser light exiting the target area, wherein the dental appliance comprises an incremental dental position adjustment appliance of a plurality of incremental dental position adjustment appliances utilized to incrementally reposition a patient's teeth from an initial position toward a target position;
wherein the target area comprises the laser mark between the interior surface and the exterior surface of the appliance body, and wherein the laser mark comprises information to track the dental appliance during manufacturing of the dental appliance.

14. The dental appliance of claim 13, wherein the particulate material is not present within a region of the appliance body adjacent to the target area.

15. The dental appliance of claim 13, wherein the particulate material comprises a pigment or dye.

16. The dental appliance of claim 13, wherein the laser mark is darker than the rougher surface texture.

* * * * *